(12) United States Patent
Murphy et al.

(10) Patent No.: US 10,463,986 B2
(45) Date of Patent: Nov. 5, 2019

(54) EXTRACTION OF ORGANIC PRODUCTS FROM PLANT AND ANIMAL MATERIALS

(71) Applicant: Metagreen Ventures, Los Angeles, CA (US)

(72) Inventors: Randall B. Murphy, Glenmoore, PA (US); Loren Erik Snyder, Streetsboro, OH (US)

(73) Assignee: METAGREEN VENTURES, Los Angeles, CA (US)

( * ) Notice: Subject to any disclaimer, the term of this patent is extended or adjusted under 35 U.S.C. 154(b) by 0 days.

(21) Appl. No.: 15/891,250

(22) Filed: Feb. 7, 2018

(65) Prior Publication Data

US 2019/0240593 A1 Aug. 8, 2019

(51) Int. Cl.
*B01D 11/02* (2006.01)
*C11B 1/10* (2006.01)
(Continued)

(52) U.S. Cl.
CPC ........ *B01D 11/0273* (2013.01); *B01D 11/028* (2013.01); *B01D 11/0288* (2013.01);
(Continued)

(58) Field of Classification Search
CPC .............. B01D 11/007; B01D 11/0296; B01D 11/0273; B01D 11/028; B01D 11/0288;
(Continued)

(56) References Cited

U.S. PATENT DOCUMENTS

| 4,228,000 A | 10/1980 | Hoeschler |
| 4,538,767 A | 9/1985 | Pimley |

(Continued)

FOREIGN PATENT DOCUMENTS

GB        374016 A  *  5/1932  ............... C11B 1/10

OTHER PUBLICATIONS

Thomas, Shane; International Search Report for PCT/US19/15172 dated Mar. 26, 2019; 3 pages.
(Continued)

*Primary Examiner* — Yate' K Cutliff
(74) *Attorney, Agent, or Firm* — Baker & McKenzie LLP

(57) ABSTRACT

The present disclosure relates, according to disclosed embodiments, to a system for extracting an organic compound from a natural source, the system comprising a computer processor operational to control the system; a storage vessel configured to store an extraction gas, the storage vessel comprising a storage vessel outlet in electrical communication with the computer processor; a valve in electrical communication with the computer processor, the valve comprising a valve inlet and a valve outlet, wherein the valve inlet connects to the storage vessel outlet; a dynamic extraction vessel; and a spray evaporation loop system configured to receive a solute from the dynamic extraction vessel, the spray evaporation loop system comprising an injection nozzle in electrical communication with the computer processor, the injection nozzle comprising an injection nozzle inlet connected to the first dynamic extraction vessel outlet; and a cyclonic separator in electrical communication with the computer processor.

16 Claims, 8 Drawing Sheets

(51) Int. Cl.
    *B01D 11/04* (2006.01)
    *B01D 11/00* (2006.01)
(52) U.S. Cl.
    CPC ...... *B01D 11/0296* (2013.01); *B01D 11/0476* (2013.01); *C11B 1/10* (2013.01); *C11B 1/104* (2013.01); *B01D 11/00* (2013.01); *B01D 11/04* (2013.01); *B01D 2011/007* (2013.01)
(58) Field of Classification Search
    CPC ....... B01D 11/00; B01D 11/04; B01D 11/076; B01D 11/0476; B01D 2011/007; C11B 1/10; C11B 1/104
    See application file for complete search history.

(56) References Cited

U.S. PATENT DOCUMENTS

| | | |
|---|---|---|
| 5,384,051 A | 1/1995 | McGinness |
| 7,404,304 B2 | 7/2008 | Yang et al. |
| 7,622,140 B2 * | 11/2009 | Whittle .............. B01D 11/0242 424/725 |
| 9,687,754 B2 | 6/2017 | Ellis |
| 2001/0021367 A1 * | 9/2001 | Powell ................... A01N 63/00 423/658.5 |
| 2010/0116267 A1 * | 5/2010 | Mraz ......................... C13K 1/02 127/1 |
| 2013/0042858 A1 | 2/2013 | Roy |
| 2016/0214920 A1 * | 7/2016 | Nadal Roura ....... A61K 36/185 |
| 2017/0368022 A1 * | 12/2017 | Sorbo .................. A61K 31/352 |

OTHER PUBLICATIONS

Thomas, Shane; Written Opinion of the International Searching Authority for PCT/US19/15172 dated Mar. 26, 2019; 7 pages.
Soccol, Carlos Ricardo, et al.; "Recent Developments and Innovations in Solid State Fermentation"; Biotechnical Research and Innovation; vol. 1, No. 1; Mar. 22, 2017; pp. 52-71.

\* cited by examiner

FIG. 2D

EXTRACTION OF ORGANIC PRODUCTS FROM PLANT AND ANIMAL MATERIALS

FIELD OF THE DISCLOSURE

The present disclosure relates, in disclosed embodiments, to systems and methods for extracting organic products from plant and animal materials.

BACKGROUND OF THE DISCLOSURE

Extraction of substances from plants, animals, or other source materials may be an important part of a process used in producing or formulating pharmaceuticals, nutraceuticals, or compositions that may be used for other desirable applications. Some desirable applications may include a treatment of illnesses, diseases, detrimental conditions, or the like. Extractions may be used to develop compositions, which may enhance physical, mental, or emotional health and well being.

Many methods have been developed for extracting natural products from source materials. System components used in these methods of natural product extraction may directly correlate to the efficiency (e.g., yield) and selectivity (e.g., purity) of the extraction and isolation process. There is a need for extraction systems that may be used to produce ample quantities of desirably selected products with reduced impurities.

SUMMARY

Accordingly, a need has arisen for improved systems and methods for extracting an organic compound from a natural source. The present disclosure relates, according to disclosed embodiments, to a system for extracting an organic compound from a natural source, the system comprising: (a) a computer processor operational to control the system; (b) a storage vessel configured to store an extraction gas, the storage vessel comprising a storage vessel outlet, wherein the storage vessel may be in electrical communication with the computer processor; (c) a valve in electrical communication with the computer processor, the valve comprising a valve inlet and a valve outlet, wherein the valve inlet connects to the storage vessel outlet; (d) a dynamic extraction vessel comprising: (i) a pressure vessel; (ii) an extraction chamber concentrically contained within the pressure vessel, wherein the extraction chamber may comprise a textured interior surface configured to agitate the natural source during an extraction process; (iii) a perforated drum configured to rotate about a principal axis of the perforated drum, wherein the perforated drum may be substantially cylindrical in shape, and wherein the perforated drum may be concentrically contained within the extraction chamber; (iv) a drum rotator in electrical communication with the computer processor; (v) a first dynamic extraction vessel inlet connected to the valve outlet; (vi) a first dynamic extraction vessel outlet; (vii) a sensor for monitoring the extraction process; and (viii) a natural source receptacle configured to receive the natural source; and (e) a spray evaporation loop system configured to receive a solute from the dynamic extraction vessel, the spray evaporation loop system comprising: (i) an injection nozzle in electrical communication with the computer processor, the injection nozzle comprising an injection nozzle inlet connected to the first dynamic extraction vessel outlet; (ii) a cyclonic separator in electrical communication with the computer processor. The system may comprise a computer processor interface for receiving the sensor signal and for receiving control signals from the computer processor; a chemical detection system; and a heat exchanger in thermal communication with the dynamic extraction vessel and the spray evaporation loop, wherein the heat exchanger may be configured to condense the extraction gas, volatilize an extraction gas, or a combination thereof; and a cleaning system in fluid communication with the dynamic extraction vessel and the spray evaporation loop system, wherein the cleaning system may comprise a cleaning solution supply tank, pressure sensors, chemical sensors, moisture sensors, temperature sensors, or a combination thereof.

In some embodiments, a method for extracting an organic compound from a natural source may comprise (a) charging a storage vessel with an extraction gas to form a charged extraction gas; (b) premixing the charged extraction gas to form a premixed extraction gas; (c) combining in a dynamic extraction vessel, the premixed extraction gas with the natural source to form an extraction mixture, wherein the dynamic extraction vessel may comprise (i) a pressure vessel; (ii) an extraction chamber concentrically contained within the pressure vessel; (iii) a perforated drum configured to rotate about a principal axis of the perforated drum, wherein the perforated drum may be substantially cylindrical in shape, and wherein the perforated drum may be concentrically contained within the extraction chamber; (iv) a drum rotator; (v) a first dynamic extraction vessel inlet connected to the valve outlet; (vi) a first dynamic extraction vessel outlet; (vii) a sensor for monitoring the extraction process; and (viii) a natural source receptacle configured to receive the natural source; (d) rotating the perforated drum containing the extraction mixture to form a spent natural source and a solute, wherein the solute may comprise an organic compound and at least a portion of the premixed extraction gas; (e) separating the solute from the spent natural source to form a separated solute and a separated spent natural source; (f) recovering at least a portion of the extraction gas from the solute to form a recovered extraction gas and a dried organic compound, wherein the dried organic compound may be substantially free of the extraction gas; and (g) recycling the recovered extraction gas to form a recycled extraction gas. The method may comprise heating the extraction mixture at a temperature from about 0° C. to about 200° C. The method may comprise sonicating the extraction mixture.

According to some embodiments, a storage vessel may be configured to store the extraction gas in a liquid state, wherein the extraction gas may be in a gaseous state at a pressure of about 14.6 psig and at a temperature of about 20° C. A dynamic extraction vessel may be configured to receive the extraction gas in a phase comprising a gaseous phase, a liquid phase, a supercritical fluid phase, or a combination thereof. An extraction chamber may comprise a textured interior surface configured to agitate the natural source during an extraction process. A textured interior surface may comprise scalloped interior surface. A dynamic extraction vessel may comprise a acoustic transducer, wherein the acoustic transducer may be configured to operate at an ultrasonic frequency of greater than about 20 kHz. A perforated drum may comprise a vane. The vane may comprise a polymer, a metal, a metal alloy, a steel, a micro-alloy steel, a steel alloy, or a combination thereof. A perforated drum may comprise a filtering layer, wherein the filtering layer may comprise a polymer, a polypropylene, a metal, a metal alloy, a steel, a micro-alloy steel, a steel alloy, a titanium, a nickel alloy, or a combination thereof.

In some embodiments, a filtering layer further may comprise a thickness from about 0.01 cm to about 1.4 cm. A drum rotator may be configured to permit the perforated drum to rotate about the principal axis at an angular velocity comprising from about 10 revolutions per minute to about 400 revolutions per minute. The drum rotator may comprise a motor, a servo motor, an internal combustion motor, a gear motor, a switch reluctance motor, a hybrid stepper motor, an electrical motor, a hydraulically powered motor, a magnetic motor, a permanent magnet DC motor, a torque motor, a cage and wound rotor induction motor, an electrically excited motor, an ironless or coreless rotor motor, a brush DC motor, a synchronous AC motor, an induction AC motor, a single phase AC motor, a three phase AC motor, a brushless DC motor, or a combination thereof. The drum rotator may comprise a hydraulic pump, an accumulator tank, and a pressure sensor. The perforated drum may comprise an inside diameter from about 0.4 m to about 4 m, an outside diameter from about 0.41 m to about 4.2 m, and a length from about 0.1 m to about 8 m.

According to some embodiments, a dynamic extraction vessel may further comprise a temperature adjusting means comprising a passive thermal control system, an active thermal control system, a condenser, a chiller loop, or a combination thereof. A pressure vessel may comprise a turbulent boundary layer enhancement device, wherein the turbulent boundary layer enhancement device may be configured to transfer heat from a wall of the pressure vessel to a wall of the perforated drum. A computer processor may comprise a cloud based controlling system, a programmable logic controller, a feedback control system, an on-off control system, a linear control system, a fuzzy logic control system, or a combination thereof. The computer processor may comprise a programmable processing unit, a memory, a random-access memory, a network interface controller, a motherboard, an input device, and an output device, wherein the processor may be configured to monitor and control the system for extracting the organic compound from the natural source.

In some embodiments, a chemical detection system may comprise an ultra-violet-visible-near infrared spectrometer, a fourier transform infrared spectrometer, a time of flight mass spectrometer, a single quadruple mass spectrometer, a gas chromatography-mass spectrometry instrument, a high-performance liquid chromatograph, a gas chromatograph, a high-performance liquid chromatography mass spectrometer, or a combination thereof. A natural source may be a plant selected from the group consisting of *Piper* spp., *Cannabis* spp., *Salvia* spp., *Banisteriopsis* spp., *Psychotria* spp., *Diplopterys* spp., *Peganum* spp., and *Humulus* spp. A natural source may be a plant selected from the group consisting of *Cannabis sativa, Banisteriopsis caapi, Psychotria viridis, Diplopterys cabrerana, Peganum harmala*, and *Humulus lupulus*.

According to some embodiments, an extraction gas may comprise a chlorofluorocarbon, a chlorofluoroolefin, a hydrochlorofluorocarbon, a hydrochlorofluoroolefin, a hydrofluorocarbon, a hydrofluoroolefin, a perfluorocarbon, a perchlorocarbon, a hydrocarbon, a haloalkane, or a combination thereof. The chlorofluorocarbon may be selected from the group consisting of trichlorofluoromethane, dichloro difluoromethane, chloro trifluoromethane, dichloro fluoromethane, chloro difluoromethane, chlorofluoromethane, pentachlorofluoroethane, 1,1,2,2-tetrachloro-1,2-difluoroethane, 1,1,1,2-tetrachloro-2,2-difluoroethane, 1,1,2-trichloro-1,2,2-trifluoroethane, 1,1,1-trichloro-2,2,2-trifluoroethane, 1,2-dichloro tetrafluoro ethane, 1,1-dichloro tetrafluoro ethane, chloro pentafluoroethane, 1,1,1,2,2,3,3-heptachloro-3-fluoropropane, hexachlorodifluoropropane, 1,1,1,3,3-pentachloro-2,2,3-trifluoropropane, 1,2,2,3-tetrachloro-1,1,3,3-tetrafluoropropane, 1,1,1-trichloro-2,2,3,3,3-pentafluoropropane, 1,2-dichloro-1,1,2,3,3,3-hexafluoropropane, 1,3-dichloro-1,1,2,2,3,3-hexafluoropropane, 1-chloro-1,1,2,2,3,3,3-heptafluoropropane, dichlorohexafluorocyclobutane, and chloroheptafluorocyclobutane. The ether may be selected from the group consisting of dimethyl ether, methyl ethyl ether, methyl n-propyl ether, methyl isopropyl ether, methyl-n-butyl ether, diethyl ether, methyl tert-butyl ether, ethyl tert-butyl ether, furan, and tetrahydrofuran. A hydrocarbon may be selected from the group consisting of methane, ethane, propane, butane, pentane, hexane, heptane, octane, nonane, decane, ethene, ethyne, propene, propyne, butene, butyne, pentene, and pentyne. The hydrofluorocarbon may comprise trifluoromethane, difluoromethane, fluoromethane, pentafluoroethane, pentafluorodimethyl ether, 1,1,2,2-Tetrafluoroethane, 1,1,1,2-tetrafluoroethane, bis(difluoromethyl)ether, 1,1,2-trifluoroethane, 1,1,1-trifluoroethane, methyltrifluoromethyl ether, 2,2,2-trifluoroethyl methyl ether, 1,2-difluoroethane, 1,1-difluoroethane, fluoroethane, 1,1,2,2,3,3,3-heptafluoropropane, trifluoromethyl 1,1,2,2-tetrafluoroethyl ether, 1,1,1,2,3,3,3-heptafluoropropane, trifluoromethyl 1,2,2,2-tetrafluoroethyl ether, 1,1,1,2,2,3-hexafluoropropane, 1,1,1,2,3,3-hexafluoropropane, 1,1,1,3,3,3-hexafluoropropane, 1,2,2,2-tetrafluoroethyl difluoromethyl ether, hexafluoropropane, pentafluoropropane, and 1,1,2,3,3-pentafluoropropane.

BRIEF DESCRIPTION OF THE DRAWINGS

Disclosed embodiments of the disclosure may be understood by referring, in part, to the present disclosure and the accompanying drawings, wherein:

FIG. 2D illustrates a process flow diagram for a system for extracting organic products according to a specific example embodiment of the disclosure;

DETAILED DESCRIPTION

Figure 1:
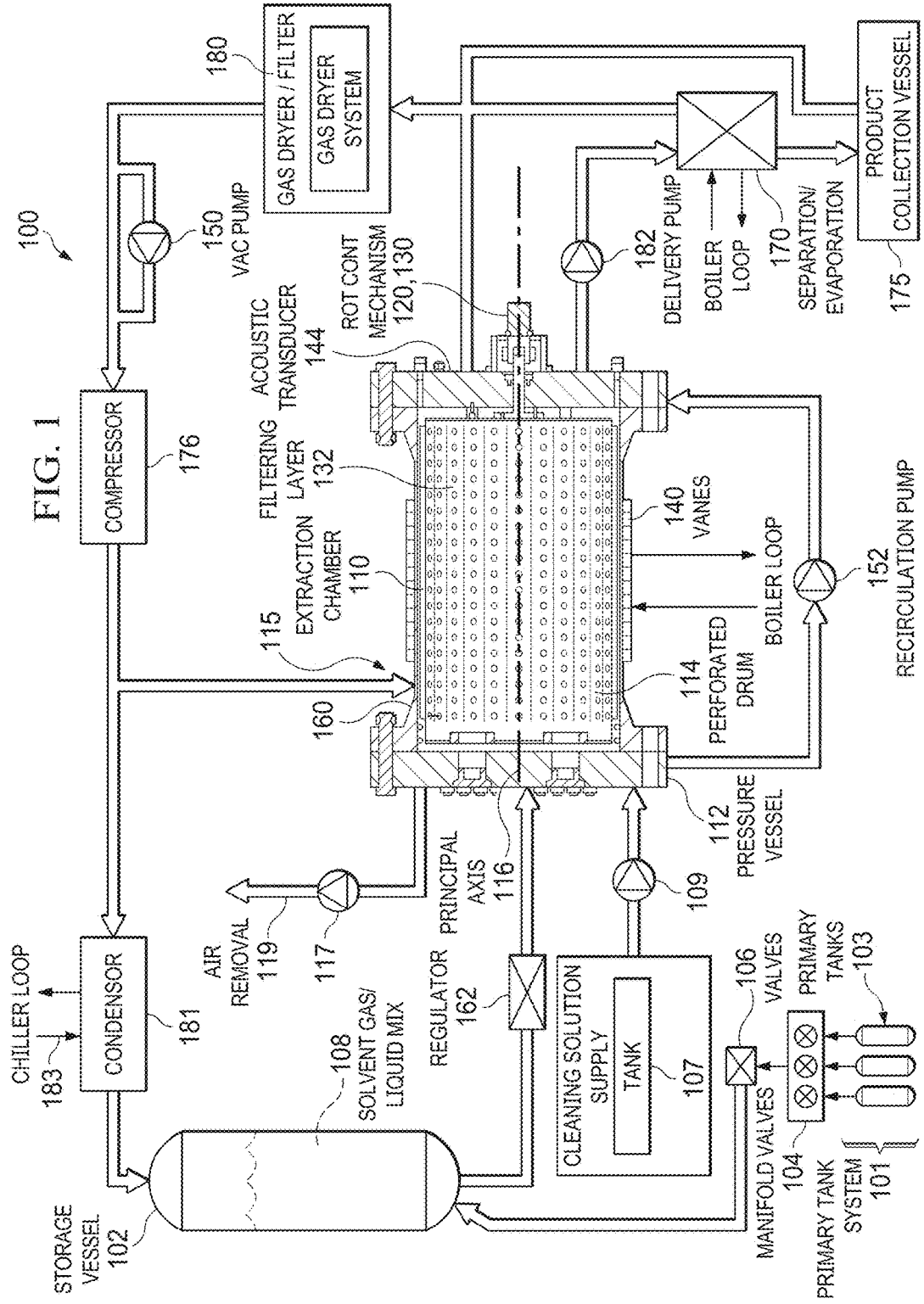
FIG. 1 illustrates a system for extracting organic products according to a specific example embodiment of the disclosure.

The present disclosure relates, in disclosed embodiments, to methods and systems for extracting organic products from a natural source. A natural source may comprise a plant material, an animal material, or a combination thereof. Compositions derived or otherwise extracted from source materials such as plants or animals may be used advantageously to treat illnesses, diseases, and detrimental conditions. Derived compositions may also help impart physical, mental, or emotional enhancements. In disclosed embodiments, plant materials may include terrestrial plants comprising shrubs, trees, roots, or berries; aquatic plants comprising ferns, algae, seaweeds, caltrops, or rice; epiphytes comprising mosses, liverworts, or lichens; and lithophytes comprising nepenthes, rock ferns, algae and liverworts. Compositions may also be derived from bacteria or fungi (e.g., yeasts and molds). Animal materials may include venoms, pheromones, bodily fluids, milks, organs, oils, and tissues derived from animals.

According to disclosed embodiments, methods and systems for extracting organic products from plant or animal materials may selectively extract organic products from the plant or animal materials. Extracting may include separating a desirable organic product or product mixture from a plant or animal material. Selectively extracting may include isolating a desirable organic product or a defined mixture of organic products from a plant or animal material, wherein the desirable organic product or defined mixture of organic products is desirably pure. An extract that is desirably pure may not require additional purification steps (e.g., chromatography or recrystallization) to reach a desirably purity.

Plants

In disclosed embodiments, methods and systems for extracting organic products may extract the organic products from plants. Plants may comprise terrestrial plants, aquatic plants, epiphytes, and lithophytes. Plants may comprise a *Piper methysticum*, a *Cannabis* spp., a *Salvia* spp., a *Banisteriopsis caapi*, a *Psychotria viridis* (chacruna), an *Echinacea* spp, a *Diplopterys cabrerana*, a *Peganum harmala*, a *Humulus lupulus*, or a combination thereof. *Cannabis* spp. may comprise *Cannabis sativa*. In disclosed embodiments, a plant may comprise an *Echinacea purpurea*, an *Echinacea angustifolia*, an *Acmella oleracea*, a *Helichrysum umbraculigerum*, a *Radula marginata*, or a combination thereof. In another embodiment the plant may be an *Echinacea* spp.

Extracts

The present disclosure relates, according to disclosed embodiments, to methods and systems for extracting organic products from a natural source. Organic products may comprise small molecules, primary metabolites, secondary metabolites, tertiary metabolites, metabolites, amino acids, fatty acids, proteins, phospholipids, carbohydrates, nucleobases, terpenes, terpenoids, porphins, porphyrins, steroids, carotenoids, vitamins, hormones, alkaloids, aromatic oils, essential oils, oils, heterocycles, aromatics, cannabinoids, or combinations thereof. An organic compound may comprise a biologically active compound, a biologically inactive compound, or a compound wherein biological activity is unknown.

In disclosed embodiments, an organic product may comprise a terpene, a humulone, a lupulone, a myrcene, a humulene, a caryophyllene, an alkaloid, a flavonoid, a cannabinoid, a menthol, a capsaicin, an anise, a camphor, a kavalactone, a salvorin, a prenylflavonoid, or combinations thereof. According to disclosed embodiments, an organic compound may be a tetrahydrocannabinol, a cannabidiol, a cannabinol, or a combination thereof. An organic compound may also be a cannabigerol, a cannabichromene, a cannabicyclol, a cannabivarin, a tetrahydrocannabivarin, a cannabidivarin, a cannabichromevarin, a cannabigerovarin, a cannabigerol monomethyl ether, a tetrahydrocannbinolic acid, a cannabidiolic acid, or a combination thereof.

Extraction Gas

The present disclosure relates, according to disclosed embodiments, to an extraction gas (e.g., FIG. 1, 108). An extraction gas may comprise a chlorofluorocarbon, a chlorofluoroolefin, a hydrochlorofluorocarbon, an ether, a hydrochlorofluoroolefin, a hydrofluorocarbon, a hydrofluoroolefin, a perfluorocarbon, a perchlorocarbon, a haloalkane, hydrocarbon, or a combination thereof. An extraction gas may desirably extract or separate an organic compound from a plant or animal material. An extraction gas may further selectively extract an organic compound from a plant or an animal material. Varying the composition of the extraction gas may adjust extraction gas/solvent characteristics comprising polarity, vapor pressure, density, dielectric constant, boiling point, or combinations thereof. For example, an extraction gas composition comprising mostly halogenated solvents may have a higher density than a corresponding extraction gas comprising mostly hydrocarbons. The composition of an extraction gas may be constant throughout an extraction process or may be changed during an extraction process. The composition of an extraction gas may be tuned or adjusted to target an extraction of specific organic compounds or definable compound mixtures for a natural source.

A hydrofluorocarbon may comprise trifluoromethane (R-23), difluoromethane (R-32), fluoromethane (R-41), pentafluoroethane (R-125), pentafluorodimethyl ether (R-E125), 1,1,2,2-Tetrafluoroethane (R-134), 1,1,1,2-tetrafluoroethane (R-134a), bis(difluoromethyl)ether (R-E134), 1,1,2-trifluoroethane (R-143), 1,1,1-trifluoroethane (R-143a), methyltrifluoromethyl ether (R-143m), 2,2,2-trifluoroethyl methyl ether (R-E143a), 1,2-difluoroethane (R-152), 1,1-difluoroethane (R-152a), fluoroethane (R=161), 1,1,2,2,3,3,3-heptafluoropropane (R-227ca), trifluoromethyl 1,1,2,2-tetrafluoroethyl ether (R-227ca2), 1,1,1,2,3,3,3-heptafluoropropane (R-227ea), trifluoromethyl 1,2,2,2-tetrafluoroethyl ether (R-227me), 1,1,1,2,2,3-hexafluoropropane (R-236cb), 1,1,1,2,3,3-hexafluoropropane (R-236ea), 1,1,1,3,3,3-hexafluoropropane (R-236fa), 1,2,2,2-tetrafluoroethyl difluoromethyl ether (R-236me), hexafluoropropane (R-FE-36), pentafluoropropane (R-245cb), 1,1,2,3,3-pentafluoropropane (R-245ea), or a combination thereof. A hydrofluorocarbon may be 1,1,1,2-tetrafluoroethane. A hydrofluorocarbon may be used as a halogenated extraction gas or solvent that desirably does not harm the ozone layer or contributes less harm to the ozone layer than other refrigerant gases. In disclosed embodiments, the hydrofluorocarbon may comprise a uniquely polar fluorine-carbon bond, which may provide desirable small molecule extraction properties.

In disclosed embodiments, a chlorofluorocarbon may comprise trichlorofluoromethane (R-11), dichlorodifluoromethane (R-12), chlorotrifluoromethane (R-13), dichlorofluoromethane (R-21), chlorodifluoromethane (R-22), chlorofluoromethane (R-31), pentachlorofluoroethane (R-111), 1,1,2,2-tetrachloro-1,2-difluoroethane (R-112), 1,1,1,2-tetrachloro-2,2-difluoroethane (R-112a), 1,1,2-trichloro-1,2,2-trifluoroethane (R-113), 1,1,1-trichloro-2,2,2-trifluoroethane (R-113a), 1,2-dichlorotetrafluoroethane (R-114), 1,1-dichlorotetrafluoroethane (R-114a), chloropentafluoroethane (R-115), 1,1,1,2,2,3,3-heptachloro-3-fluoropropane (R-211), hexachlorodifluoropropane (R-212), 1,1,1,3,3-pentachloro-2,2,3-trifluoropropane (R-213), 1,2,2,3-tetrachloro-1,1,3,3-tetrafluoropropane (R214), 1,1,1-trichloro-2,2,3,3,3-pentafluoropropane (R215), 1,2-dichloro-1,1,2,3,3,3-hexafluoropropane (R-216), 1,3-dichloro-1,1,2,2,3,3-hexafluoropropane (R-216ca), 1-chloro-1,1,2,2,3,3,3-heptafluoropropane (R-217), dichlorohexafluorocyclobutane (R-C316), chloroheptafluorocyclobutane (R-C317), or combinations thereof.

An ether may comprise dimethyl ether, methyl ethyl ether, methyl n-propyl ether, methyl isopropyl ether, methyl-n-butyl ether, diethyl ether, methyl tert-butyl ether, ethyl tert-butyl ether, furan, tetrahydrofuran, or combinations thereof. The ether may contribute a polar component of an extraction gas. A hydrocarbon may comprise methane, ethane, propane, butane, pentane, hexane, heptane, octane, nonane, decane, ethene, ethyne, propene, propyne, butene, butyne, pentene, pentyne, or combinations thereof. The hydrocarbon may contribute a non-polar component of the extraction gas.

Systems for Extracting Organic Compounds

Figure 2:
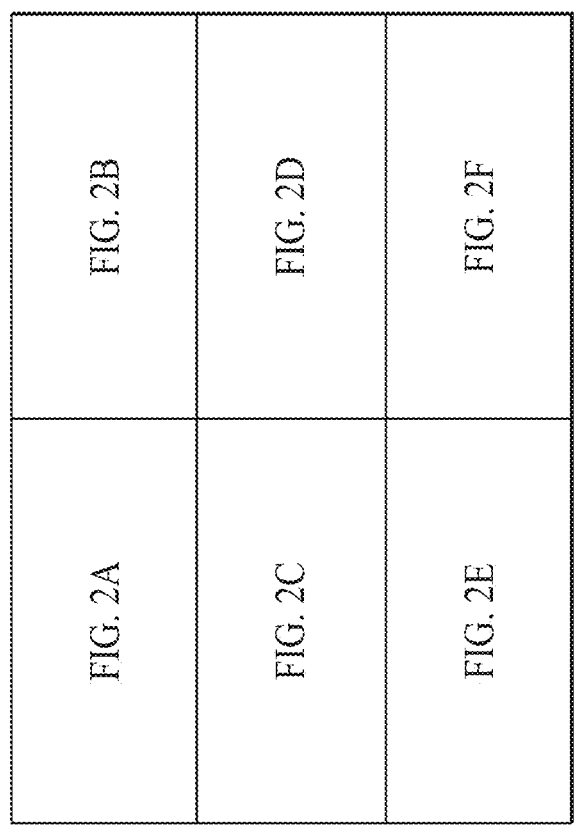
FIG. 2 illustrates FIGS. 2A-2F according to a specific example embodiment of the disclosure.
Figure 2A:
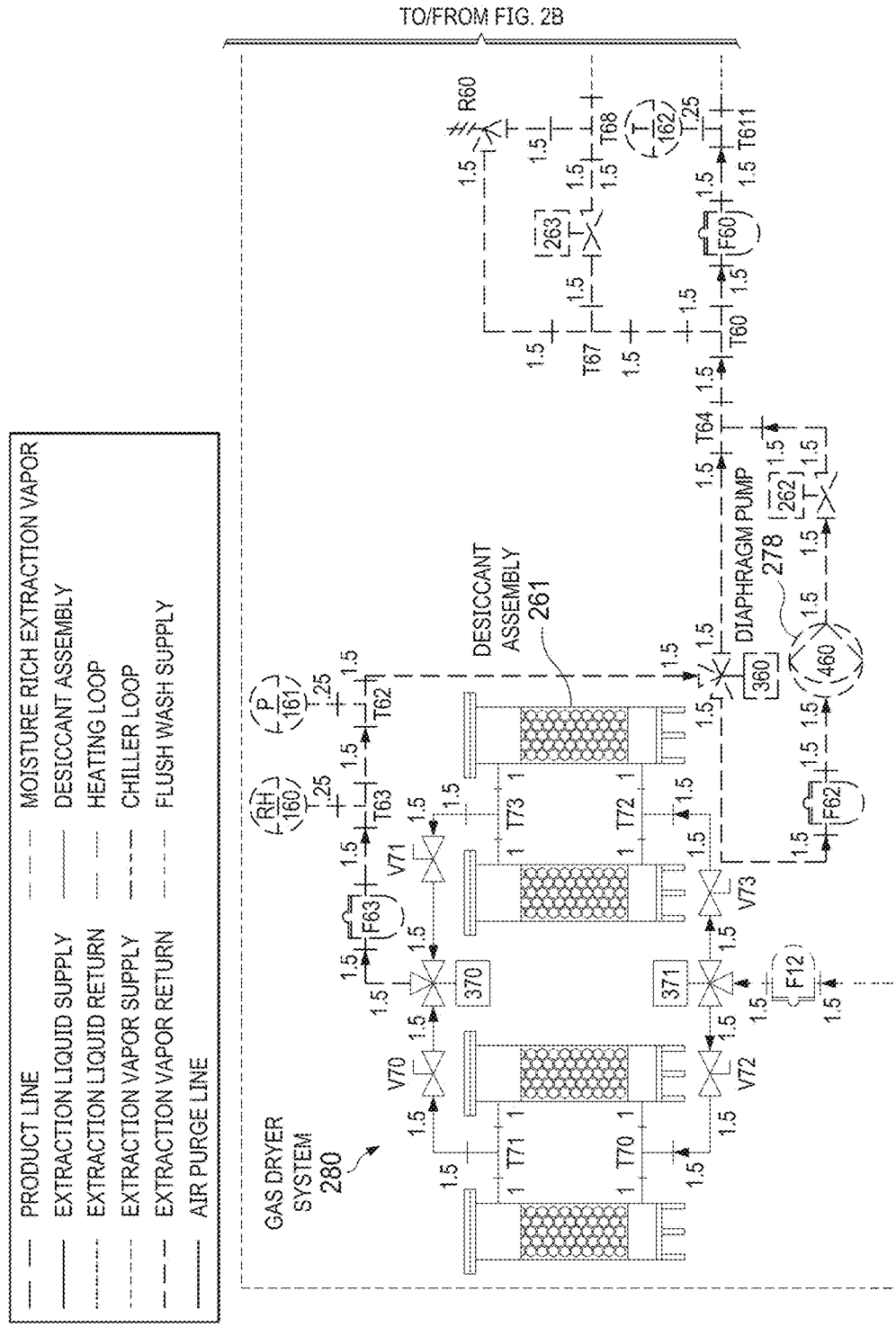
FIG. 2A illustrates a process flow diagram for a system for extracting organic products according to a specific example embodiment of the disclosure.
Figure 2B:
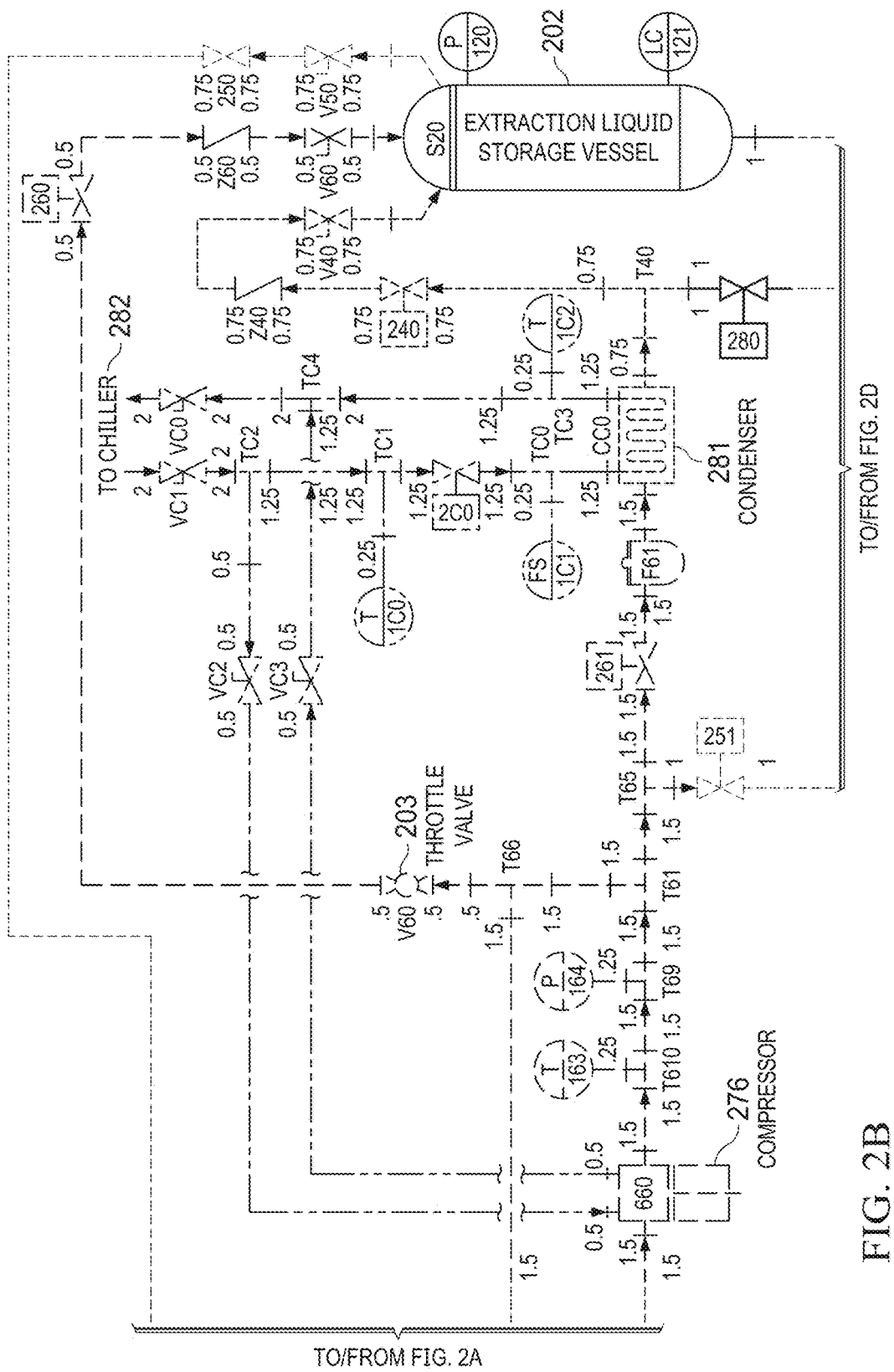
FIG. 2B illustrates a process flow diagram for a system for extracting organic products according to a specific example embodiment of the disclosure.
Figure 2C:
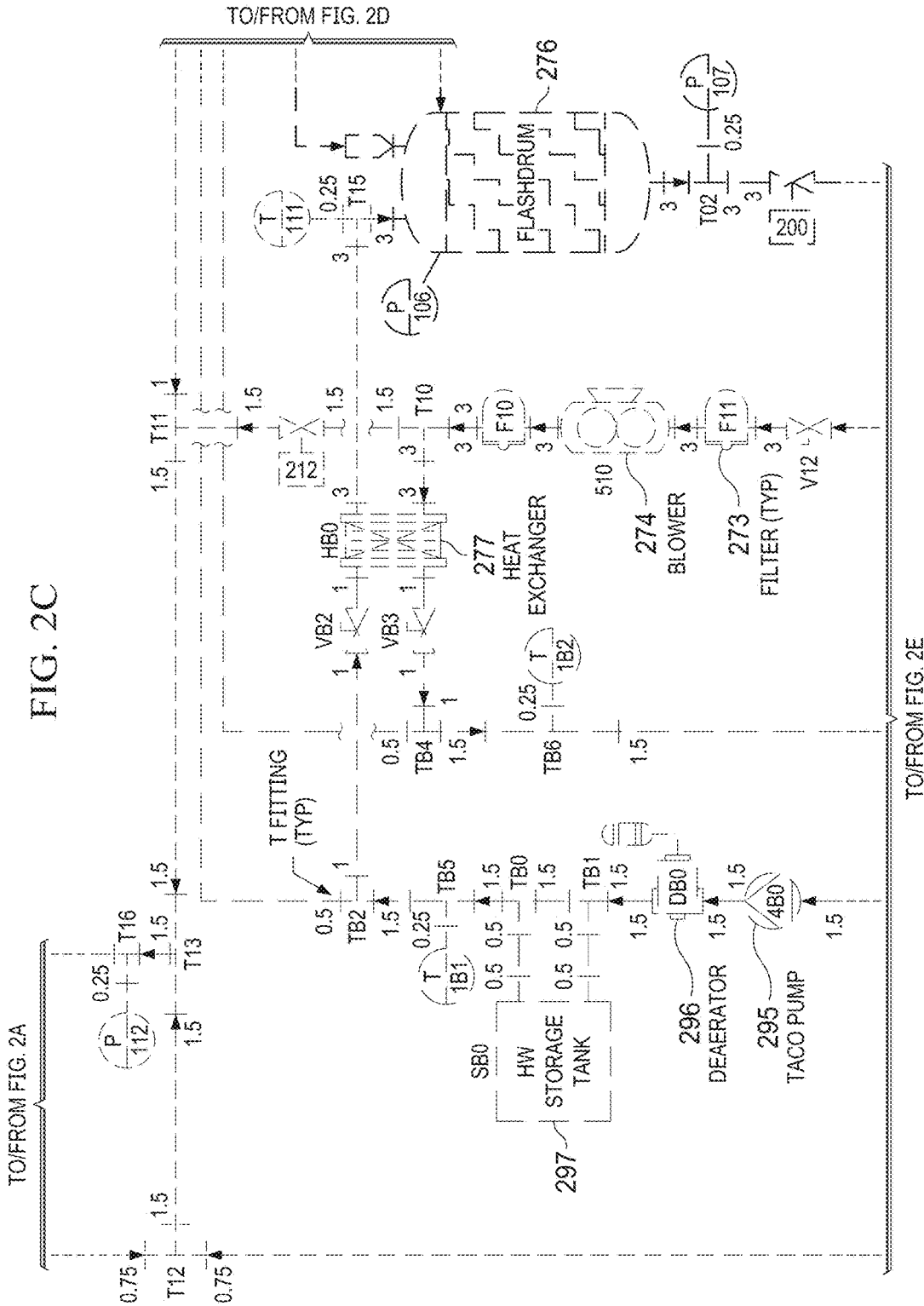
FIG. 2C illustrates a process flow diagram for a system for extracting organic products according to a specific example embodiment of the disclosure.
Figure 2D:
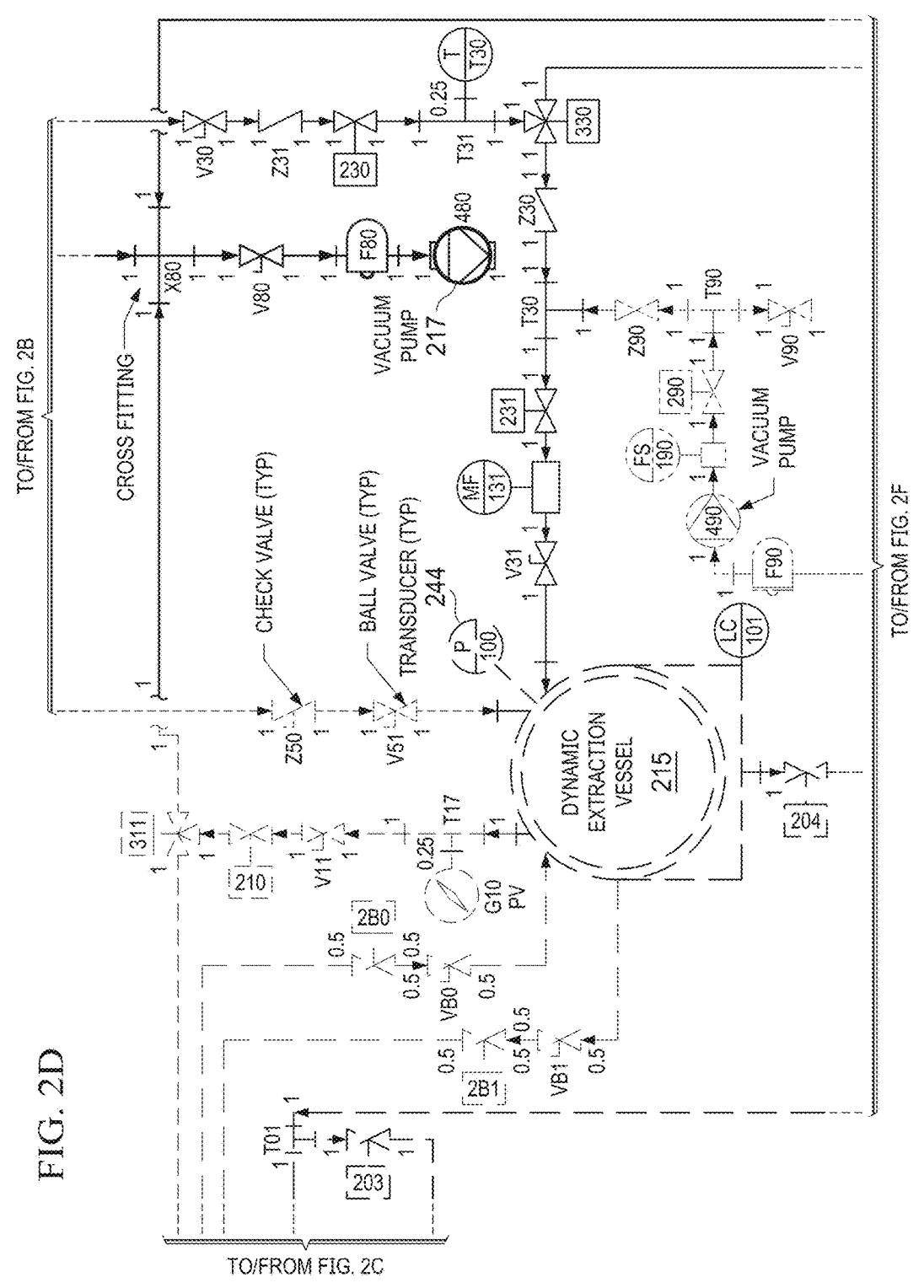
Figure 2E:
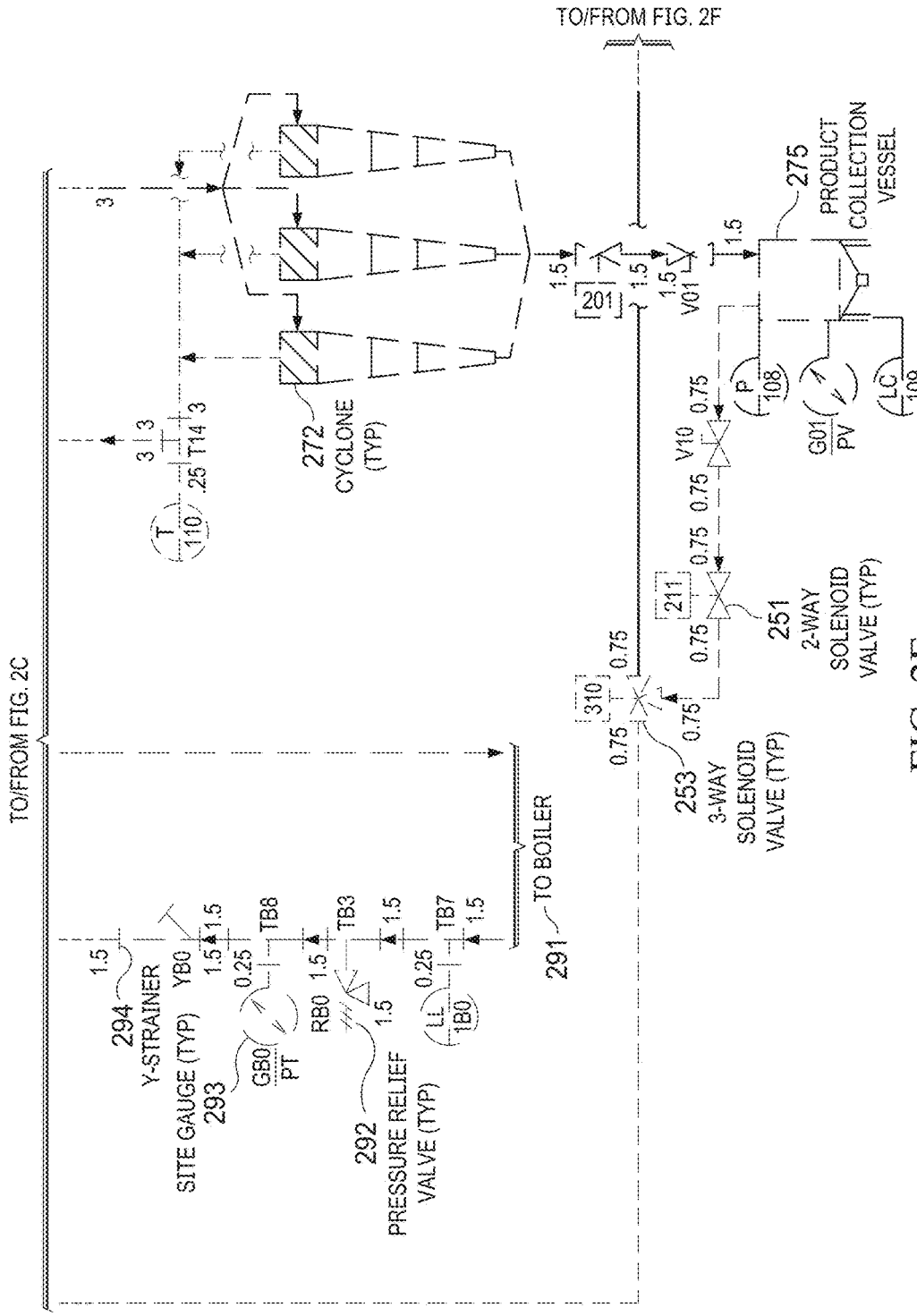
FIG. 2E illustrates a process flow diagram for a system for extracting organic products according to a specific example embodiment of the disclosure.
Figure 2F:
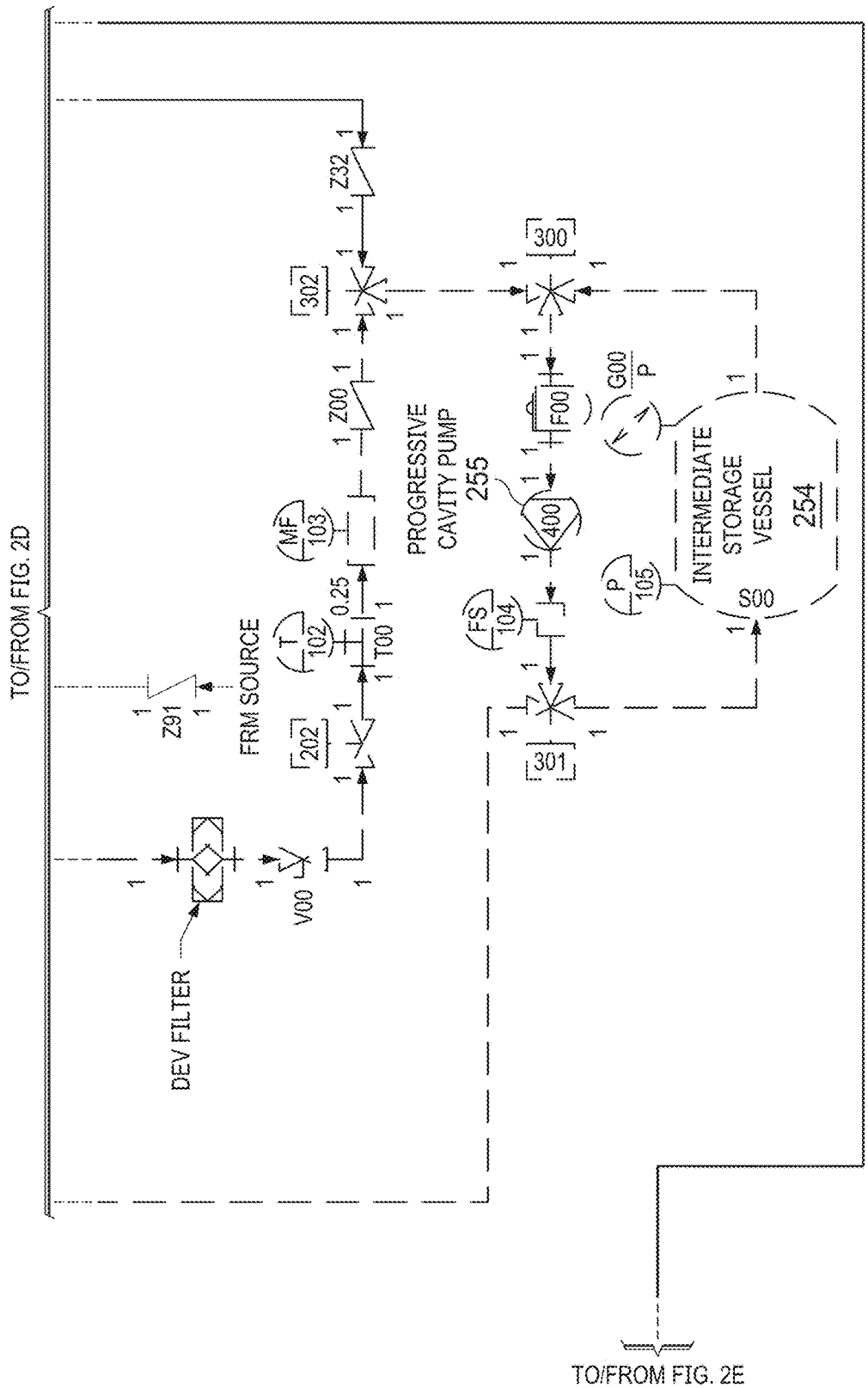
FIG. 2F illustrates a process flow diagram for a system for extracting organic products according to a specific example embodiment of the disclosure.

The present disclosure relates, according to disclosed embodiments, to systems for extracting organic compounds from a natural source. FIG. 2 as recited below is a composite of FIGS. 2A-2F. A system (e.g., FIG. 1, 100; FIG. 2, 200) for extracting organic compounds from a natural source may comprise a primary tank system (e.g., FIG. 1, 101), a storage vessel (e.g., FIG. 1, 102; FIG. 2, 202), a dynamic extraction vessel (e.g., FIG. 1, 115; FIG. 2, 215), a spray evaporation loop system (e.g., FIG. 1, 170; FIG. 2, 270), a gas dryer system (e.g., FIG. 1, 180; FIG. 2, 280), a product collection vessel (e.g., FIG. 1, 175; FIG. 2, 275), a compressor (e.g., FIG. 1, 176; FIG. 2, 276), a condenser (e.g., FIG. 1, 181; FIG. 2, 281), a boiler system (e.g., FIG. 2, 290), an intermediate storage vessel (e.g., FIG. 2, 254), a sensor system, a computer processor, and a cleaning system. The components of the system, may comprise various configurations, wherein the components are mechanically interconnected or connected in fluid, gaseous, or solid communication with other components of the system in different arrangements.

According to disclosed embodiments, a system (e.g., FIG. 1, 100; FIG. 2, 200) may comprise a primary tank system comprising a primary tank (e.g., FIG. 1, 103), wherein an outlet of the primary tank may be connected to an inlet of a valve manifold (e.g., FIG. 1, 104). An outlet of the valve manifold may connect to an inlet of a valve (e.g., FIG. 1, 106) that connects to an inlet of a storage vessel (e.g., FIG. 1, 102). The valve may regulate the flow of a primary extraction gas from a primary tank (e.g., FIG. 1, 103) to a storage vessel. The primary tank system may desirably permit quantities primary extraction gases or solvents to be mixed in desirable ratios and at desirable quantities to form an extraction gas. A primary tank system may comprise pressure or chemical sensors, which may provide data to a computer processor that may be stored by the computer processor in a computer-readable medium. The computer processor may comprise a cloud based controlling system, a programmable logic controller, a feedback control system, an on-off control system, a linear control system, a fuzzy logic control system, or a combination thereof. The computer processor may control the primary tank system mixing ratios or rates instantaneously or through computer-readable instructions stored in the computer-readable medium.

An outlet of a storage vessel (e.g., FIG. 1, 102) comprising an extraction gas (e.g., FIG. 1, 108) may be connected to an inlet of a gas dryer system (e.g., FIG. 1, 180; FIG. 2, 280) and a dynamic extraction vessel (e.g., FIG. 1, 115; FIG. 2, 215). For example, an outlet of the storage vessel may connect to a valve, which may connect to an inlet of the dynamic extraction vessel (e.g., FIG. 1, 115), wherein the valve may regulate the flow of an extraction gas (e.g., FIG. 1, 108) from the storage vessel to the dynamic extraction vessel. A flow sensor or a pressure sensor may detect flow rates at pressures of the extraction gas and provide data thereon that may be stored by and processed a computer processor in a computer-readable medium. The computer processor may control the flow rates or pressures of the extraction gas instantaneously or through computer-readable instructions stored in the computer-readable medium.

In disclosed embodiments, a dynamic extraction vessel (e.g., FIG. 1, 115; FIG. 2, 215) may comprise an extraction chamber (e.g., FIG. 1, 110), a natural source, a pressure vessel (e.g., FIG. 1, 112), a drum rotator (e.g., FIG. 1, 130), a temperature adjusting control element, and a perforated drum (e.g., FIG. 1, 114). In the extraction chamber, a natural source may be contacted with the extraction gas to produce a solute, wherein the solute comprises an organic compound and at least a portion of the premixed extraction gas. An outlet of the dynamic extraction vessel may connect to an inlet of a spray evaporation loop system (e.g., FIG. 1, 170; FIG. 2, 270), a boiler system (e.g., FIG. 2, 290), or an intermediate storage vessel (e.g., FIG. 2, 254). The spray evaporation loop system, may be configured to receive the solute from the dynamic extraction vessel. A delivery pump (e.g., FIG. 1, 182) may control the flow of the solute from the dynamic extraction vessel, to the spray evaporation loop system or an intermediate storage vessel (e.g., FIG. 2, 254). A delivery pump may comprise a progressive cavity pump, a rotary lobe pump, a gear pump, or combinations thereof. An outlet of the intermediate storage vessel may connect to an injection nozzle (e.g., FIG. 2, 271) of the spray evaporation loop system. A delivery pump (e.g., progressive cavity pump) (e.g., FIG. 2, 255) may regulate the flow of an output from the intermediate storage vessel to an injection nozzle of the spray evaporation loop system.

According to disclosed embodiments, a spray evaporation loop system (e.g., FIG. 1, 170; FIG. 2, 270), may comprise a injection nozzle (e.g., FIG. 2, 271), a flash drum (e.g., FIG. 2, 276), a cyclonic separator (e.g., FIG. 2, 272), at least one filter (e.g., FIG. 2, 273), a blower (e.g., FIG. 2, 274), and a heat exchanger (e.g., FIG. 2, 277). The flash drum may be configured to receive a solute spray from the injection nozzle, wherein the flash drum may feed the solute to the cyclonic separator. The solute may be obtained in a relatively pure form from the underflow outlet of the cyclonic separator. The loop of the spray evaporation loop system, may comprise a flash drum, connected to the cyclonic separator, which may be connected to a filter, which may be connected to a blower, which may be connected to a heat exchanger, which may be connected back to the flash drum. In disclosed embodiments, the heat exchanger may connect to a boiler system (e.g., FIG. 2, 290), wherein the heat exchanger may be configured to receive heat from a boiler system. An outlet of a cyclonic separator may be connected to an inlet of the product collection vessel (e.g., FIG. 1, 175; FIG. 2, 275), wherein the product collection vessel is configured to receive an organic compound from the cyclonic separator. The organic compound may be substantially free from an extraction gas. The product collection vessel, may connect to a gas dryer system (e.g., FIG. 1, 180; FIG. 2, 280) and a dynamic extraction vessel (e.g., FIG. 1, 115; FIG. 2, 215). A 2-way solenoid valve (e.g., FIG. 2, 251) or a 3-way solenoid valve (e.g., FIG. 2, 253) may regulate flow of an extraction gas (e.g., FIG. 1, 108) from the product collection vessel, wherein residual extraction gas may be removed from the organic product.

In disclosed embodiments, a system (e.g., FIG. 1, 100; FIG. 2, 200) for extracting organic compounds from a natural source may comprise a boiler system (e.g., FIG. 2, 290). The boiler system may connect to a heating jacket of a dynamic extraction vessel (e.g., FIG. 1, 115; FIG. 2, 215)

and a spray evaporation loop system (e.g., FIG. 1, 170; FIG. 2, 270) through a heat loop. The heat loop may provide heat or exchange heat with the dynamic extraction vessel or the spray evaporation loop system. The boiler system may comprise a loop of a boiler (e.g., FIG. 2, 291) connected to a pressure relief valve (e.g., FIG. 2, 292), which may be connected to a site gauge (e.g., FIG. 2, 293), which may be connected to a y-strainer (e.g., FIG. 2, 294), which may be connected to a de-aerator (e.g., FIG. 2, 296), which may be connected to a water storage tank (e.g., FIG. 2, 297), which may connect back to the boiler.

According to disclosed embodiments, a system (e.g., FIG. 1, 100; FIG. 2, 200) for extracting organic compounds from a natural source may comprise a gas dryer system (e.g., FIG. 1, 180; FIG. 2, 280), wherein an outlet of the gas dryer system is connected to an inlet of a compressor (e.g., FIG. 1, 176; FIG. 2, 276), wherein the flow may be regulated by a vacuum pump (e.g., FIG. 1, 150). A gas dryer system may comprise a desiccant assembly (e.g., FIG. 2, 261) comprising a desiccant packed tower (e.g., column) comprising a desiccant. An outlet of a compressor (e.g., FIG. 1, 176) may connect to an inlet system (e.g., FIG. 1, 160) of a dynamic extraction vessel (e.g., FIG. 1, 115; FIG. 2, 215) or an inlet of a condenser (e.g., FIG. 1, 181; FIG. 2, 281). An outlet of the condenser, may connect to an inlet of a storage vessel (e.g., FIG. 1, 102; FIG. 2, 202), an inlet of the dynamic extraction vessel, an inlet of the gas dryer system, or a combination thereof. The condenser may connect to a chiller through the chiller loop.

In disclosed embodiments, a system (e.g., FIG. 1, 100; FIG. 2, 200) may comprise a cleaning solution supply tank (e.g., FIG. 1, 107) comprising a cleaning solution, wherein an outlet of the cleaning solution supply tank may be connected to an inlet of a dynamic extraction vessel (e.g., FIG. 1, 115; FIG. 2, 215). A cleaning solution supply pump (e.g., FIG. 1, 109) may regulate the flow of the cleaning solution from the cleaning solution supply tank (e.g., FIG. 1, 107) to the dynamic extraction vessel.

Storage Vessel

A system (e.g., FIG. 1, 100; FIG. 2, 200) for extracting organic compounds from a natural source may comprise a storage vessel (e.g., FIG. 1, 102; FIG. 2, 202). The storage vessel may be configured as a reservoir for an extraction gas (e.g., FIG. 1, 108) or an extraction liquid. The storage vessel may be configured to store an extraction gas in a liquid state, wherein the extraction gas is in a gaseous state at a pressure of about 14.6 psig and at a temperature of about 20° C. The storage vessel may be configured to store an extraction gas in a phase, the phase comprising a gas, a liquid, a supercritical fluid, or a combination thereof. The storage vessel may be configured to store an extraction gas as a compressed gas (e.g., liquefied gas), a non-liquefied gas, or a dissolved gas. The dissolved gas may comprise a gas dissolved in solvent or a gas dissolved in another gas. In disclosed embodiments, the storage vessel may be configured to maintain a pressure wherein a chemical may be in a liquid state at the pressure, and wherein the chemical may be in a gaseous state at a pressure of about 14.6 psig and at a temperature of about 20° C. The storage vessel may comprise volume sensors, chemical sensors, pressure sensors, temperature sensors, or a combination thereof, wherein the sensors may obtain data that may be stored by a computer processor in a computer-readable medium. The computer processor may be configured to control the pressure, extraction gas composition, and extraction gas volume of the pressure vessel instantaneously or through computer-readable instructions stored in the computer-readable medium.

A storage vessel (e.g., FIG. 1, 102; FIG. 2, 202) may be connected to and be configured to receive an extraction gas (e.g., FIG. 1, 108) from a primary tank system (e.g., FIG. 1, 101), a condenser (e.g., FIG. 1, 181; FIG. 2, 281), a gas dryer system (e.g., FIG. 1, 180; FIG. 2, 280), a spray evaporation loop system (e.g., FIG. 1, 170; FIG. 2, 270), a dynamic extraction vessel (e.g., FIG. 1, 115; FIG. 2, 215), or a combination thereof.

A primary tank system (e.g., FIG. 1, 101) may comprise a primary tank (e.g., FIG. 1, 103), a valve manifold (e.g., FIG. 1, 104), and a valve (e.g., FIG. 1, 106). The primary tank system (e.g., FIG. 1, 101) may provide an extraction gas (e.g., FIG. 1, 108) to a storage vessel (e.g., FIG. 1, 102; FIG. 2, 202). The extraction gas may comprise a combination of primary extraction gases, wherein the primary extraction gases may be provided by or stored in the primary tank. The valve manifold may feed the primary gas from the primary tank through a valve to the storage vessel. According to disclosed embodiments, a system (e.g., FIG. 1, 100; FIG. 2, 200) may comprise the primary tank system comprising primary the primary tank, wherein an outlet of the primary tank may be connected to an inlet of the valve manifold. An outlet of the valve manifold may connect to an inlet of a valve (e.g., FIG. 1, 106) that connects to an inlet of the storage vessel. The valve may regulate the flow of the primary extraction gas from a primary tank to the storage vessel. The valve manifold may comprise a Coriolis-type mass flowmeter, a duty cycle-controlled proportioning valve, or a combination thereof. In disclosed embodiments, the valve manifold may combine or premix more than one primary extraction gases in various ratios and then provide the combined primary extraction gases as an extraction gas to the storage vessel. Premixing the primary extraction gas may desirably enable proportioning of mixtures of the extraction gas in a dynamic equilibrium, the dynamic equilibrium comprising concentration, state, pressure, temperature, or combinations thereof. The primary extraction gas may comprise a chlorofluorocarbon, a chlorofluoroolefin, a hydrochlorofluorocarbon, an ether, a hydrochlorofluoroolefin, a hydrofluorocarbon, a hydrofluoroolefin, a perfluorocarbon, a perchlorocarbon, a haloalkane, a hydrocarbon, or a combination thereof.

A storage vessel (e.g., FIG. 1, 102; FIG. 2, 202) may comprise a steel, a stainless steel, a metal alloy, a micro-alloy metal, a polymer (e.g., polytetrafluoroethylene), a composite (e.g., fiberglass, epoxy resin, carbon fiber) or a combination thereof. The storage vessel may comprise an inner liner. An inner liner may comprise a stainless steel, a metal alloy, a micro-alloy metal, a polymer (e.g., polytetrafluoroethylene), or a combination thereof. The storage vessel comprising a liner may desirably maintain a purity, an integrity, or an identity of an extraction gas (e.g., FIG. 1, 108).

A storage vessel (e.g., FIG. 1, 102; FIG. 2, 202) may be configured to operate in batch or in flow. The storage vessel may comprise a volume from about 1 mL to about 10 mL, or from about 10 mL to about 100 mL, or from about 100 mL to about 1 L, or from about 1 L to about 100 L, or from about 100 L to about 1000 L, or from about 1000 L to about 10,000 L, or from about 10,000 L to about 100,000 L. The storage vessel (e.g., FIG. 1, 102; FIG. 2, 202) may be configured for a bench top scale, a pilot plant scale, or a plant scale. The storage vessel may comprise a capacity to hold a volume of an extraction gas (e.g., FIG. 1, 108), wherein the storage vessel may be used for an extraction cycle.

A storage vessel (e.g., FIG. 1, 102; FIG. 2, 202) may be configured to provide an extraction gas (e.g., FIG. 1, 108) to a dynamic extraction vessel (e.g., FIG. 1, 115; FIG. 2, 215) at a pressure from about 15 pounds per square inch gauge (psig) to about 4000 psig. The storage vessel may be configured to provide the extraction gas to the dynamic extraction vessel at a pressure from 75 psig to about 250 psig. For example, the storage vessel may be configured to provide the extraction gas to the dynamic extraction vessel at a pressure comprising about 75 psig, or about 100 psig, or about 125 psig, or about 150 psig, or about 175 psig, or about 200 psig, or about 225 psig, or about 250 psig. The outlet of a storage vessel comprising an extraction gas may be connected to the dynamic extraction vessel. For example, an outlet of the storage vessel may connect to a valve, which may connect to an inlet of the dynamic extraction vessel, wherein the valve may regulate the flow of an extraction gas from the storage vessel to the dynamic extraction vessel.

Dynamic Extraction Vessel

In disclosed embodiments, a system for extracting organic compounds from a natural source may comprise a dynamic extraction vessel (e.g., FIG. 1, 115; FIG. 2, 215). The dynamic extraction vessel may be configured to receive the natural source. The dynamic extraction vessel may be configured to receive an extraction gas (e.g., FIG. 1, 108) in a phase, the phase comprising a gas, a liquid, a supercritical fluid, or a combination thereof. The dynamic extraction vessel may comprise an extraction chamber (e.g., FIG. 1, 110), wherein a natural source may be contacted with an extraction gas to produce a solute, wherein the solute comprises an organic compound and at least a portion of the premixed extraction gas.

A dynamic extraction vessel may comprise (e.g., FIG. 1, 115; FIG. 2, 215) a pressure vessel (e.g., FIG. 1, 112) that concentrically contains an extraction chamber (e.g., FIG. 1, 110), which may be substantially cylindrical in shape and a perforated drum (e.g., FIG. 1, 114), wherein the perforated drum may be substantially cylindrical in shape. The perforated drum may be concentrically contained within the extraction chamber, wherein the perforated drum and the extraction chamber are aligned about a principal axis 116. In disclosed embodiments, the perforated drum may be configured to spin about a principal axis, wherein the drum rotator may regulate the rotational velocity of the perforated drum.

A natural source may be dispensed into the inside of the perforated drum (e.g., FIG. 1, 114) through a pressure vessel (e.g., FIG. 1, 112) as a solid, a liquid, a gas, or a combination thereof. For example a plant matter may be dispensed whole or substantially homogenized (e.g., crushed) into the inside of a perforated drum through an inlet (e.g., door, hatch, or port) of the pressure vessel. Homogenizing the natural source may comprise grinding (e.g., tissue disruption with a mortar and pestle), shearing (e.g., applying tangential force with a blender), beating (e.g., striking with glass beads), and shocking (e.g., applying an ultrasonic sound energy). In disclosed embodiments, the natural source may be solubilized and then dispensed into the inside of a perforated drum through an injection port. The natural source may be milled by a mill. For example, a mill may comprise a ball mill, a rod mill, a pebble mill, a Buhrstone mill, a tower mill, an autogenous mill, an SAG mill, or a combination thereof. The natural source may also be solubilized with a solvent (e.g., methanol), adsorbed onto an adsorbent, (e.g., silica, clay, and alumina), optionally having the solvent removed, and then introducing the adsorbed natural source into the inside of the perforated drum. In disclosed embodiments, the natural source may be loaded into a dynamic extraction vessel (e.g., FIG. 1, 115; FIG. 2, 215) through a door of the pressure vessel. The natural source may be placed in a material chamber, wherein the material chamber containing the natural source is placed inside the perforated drum. Once the natural source is loaded into a dynamic extraction vessel, a vacuum pump (e.g., FIG. 1, 117) may evacuate the atmosphere into an air removal vessel (e.g., FIG. 1, 119). In disclosed embodiments, the vacuum pump may reduce the pressure within the pressure vessel may be below about 200 millitorr (mTorr), or below about 175 mTorr, or below about 150 mTorr, or below about 125 mTorr, or below about 100 mTorr, or below about 75 mTorr, or below about 50 mTorr, or below about 25 mTorr. Pressure sensors may provide pressure and volume data for the pressure vessel that may be stored by a computer processor in a computer-readable medium, wherein the computer processor may control the evacuation vacuum pump to recover gases. The computer processor may control the evacuation pump instantaneously or through computer-readable instructions stored in the computer-readable medium.

A pressure vessel (e.g., FIG. 1, 112) may comprise an evacuation vacuum pump (e.g., FIG. 1, 117) and an air removal vessel (e.g., FIG. 1, 119). The evacuation vacuum pump may be configured to evacuate (e.g., exhaust) a pressure vessel. Evacuating a pressure vessel (e.g., FIG. 1, 112) may evacuate a charge of air, oxygen, nitrogen, hydrogen, water, an extraction gas (e.g., FIG. 1, 108), or combinations thereof, wherein the evacuation may be collected in an air removal vessel, vented outside of the system (e.g., FIG. 1, 100; FIG. 2, 200), vented into the environment, or a combination thereof. In disclosed embodiments, it may be desirable to evacuate the pressure vessel before, during, or after a method of extracting an organic compound from a natural source. Evacuating the pressure vessel may desirably permit penetration of the extraction gas into the natural source. Evacuating the pressure vessel may desirably prevent degradation of the organic compound (e.g., pharmaceutically active material) present in the natural source. Evacuating the pressure vessel may desirably prevent trapping of noncondensible gases into the condensed gas reservoir. In disclosed embodiments, the pressure vessel may comprise a recirculation pump (e.g., FIG. 1, 152). The recirculation pump may comprise a liquid pump, a gas pump, or a combination thereof. The liquid pump may permit recirculation of the extraction gas through the pressure vessel. Recirculation may permit analysis of a sample by an instrumentation, the instrumentation comprising an ultra-violet-visible-near infrared (UV-VIS-NIR) spectrometer, a fourier transform infrared (FTIR) spectrometer, a gas chromatograph (GC), a GC-mass spectrometry (MS), a high performance liquid chromatography (HPLC), an HPLC-MS, or a combination thereof. The computer processor may control flow rate of the extraction gas through the recirculation pump instantaneously or through computer-readable instructions stored in the computer-readable medium. The computer process may also control sample analysis and manage data provided through analysis by the instrumentation. Data provided through analysis by the instrumentation may be stored by the computer processor in a computer-readable medium.

A pressure vessel (e.g., FIG. 1, 112) may comprise a chamber surface. The chamber surface may comprise a turbulent boundary layer enhancement device, wherein the turbulent boundary layer enhancement device may desirably transfer heat from a wall of a pressure vessel to a drum wall. The chamber surface may have circular divots, polygonal divots, hexagonal divots, or combinations thereof. Heat transfer may be by contact to a tumbling extraction material.

The desirable heat transfer between a chamber surface of a pressure vessel, an extraction chamber (e.g., FIG. 1, 110), and the drum comprising a natural source and a wall comprising vanes (e.g., FIG. 1, 140) may be desirably achieved by permitting a narrow boundary region between an outer surface of the perforated drum (e.g., FIG. 1, 114) and a wall of the pressure vessel. The narrow boundary region may provide effective (e.g., turbulent) flow of materials (e.g., a natural source and an extraction gas). The narrow boundary region may advantageously permit heat transfer from the pressure vessel to and from a natural source. In disclosed embodiments, a desirable heat transfer from the pressure vessel to and from the natural source may permit an extraction gas (e.g., FIG. 1, 108) contained within the natural source (e.g., residual gas) to be removed from the natural source before, during, or after an extraction run. If the extraction gas contained within the natural source is not removed from the natural source, the extraction gas may remain substantially entrapped in the natural source and may slowly effuse from the natural source. Removal of the extraction gas from the natural source may permit recycling of the extraction gas. Slow effusion of an extraction gas from a natural source may permit residual gas to release to an environment. The narrow boundary region may comprise a distance from about 0.5 cm to about 5.0 cm. For example, the narrow boundary region may comprise a distance of about 0.5 cm, or of about 1.0 cm, or of about 1.5 cm, or of about 2.0 cm, or of about 2.5 cm, or of about 3.0 cm, or of about 3.5 cm, or of about 4.0 cm, or of about 4.5 cm, or of about 5.0 cm. In some embodiments, the narrow boundary region may comprise a distance from about 1 cm to about 2 cm.

A perforated drum (e.g., FIG. 1, 114) may be configured to spin about a principal axis 116. The perforated drum may be coupled to a drum rotator (e.g., FIG. 1, 130) (e.g., motor), wherein the drum rotator is configured to permit the perforated drum to rotate about a principal axis (e.g., FIG. 1, 116). In disclosed embodiments, the perforated drum may spin along a principal axis of the perforated drum at a frequency from about 10 revolutions per minute (rpm) to about 400 rpm. In disclosed embodiments, the perforated drum may spin along the principal axis of the perforated drum at more than one angular velocity. For example, the perforated drum may spin at one angular velocity at one time and then spin at another angular velocity at another time. In disclosed embodiments, the perforated drum may have an inside diameter from about 0.4 m to about 4 m, an outside diameter from about 0.41 m to about 4.2 m, and a length from about 0.1 m to about 8 m. A velocity sensor, a position sensor, or a combination thereof may provide data on the angular velocity of the perforated drum, wherein the data may be stored by a computer processor in a computer-readable medium. The computer processor may control the angular velocity of the perforated drum instantaneously or through computer-readable instructions stored in the computer-readable medium. Mechanical energy derived from spinning may desirably permit absorption of an extraction gas (e.g., FIG. 1, 108) by a natural source, a spent source, or a combination thereof. Mechanical energy derived from spinning may desirably enhance removal of an extraction gas from a natural source, a spent source, or a combination thereof. The perforated drum may comprise a metal, a steel, a stainless steel, a metal alloy, a micro-alloy metal, a polymer, or a combination thereof. The perforated drum may comprise a material that may be desirably inert relative to an extraction solvent, an organic compound, at least one natural source, or combinations thereof.

According to some embodiments, an angular velocity of a perforated drum (e.g., FIG. 1, 114) may be modulated between an angular velocity no greater than a critical tumbling speed of an extraction mixture, a natural source, a spent source, or a combination thereof within the perforated drum. In disclosed embodiments, modulating an angular velocity of a perforated drum relative to an extraction mixture, a natural source, a spent source, or a combination thereof within the perforated drum may desirably permit heat transfer by a direct conduction of a surface of the extraction mixture, the natural source, the spent source, or the combination thereof and an inner wall of the perforated drum. The high angular velocity (e.g., 400 rpm) may desirably permit a high heat transfer between a wall of a pressure vessel (e.g., FIG. 1, 112) and a wall of a perforated drum. A timing and a duty cycle of a modulated angular velocity of a perforated drum may vary as a pressure within a pressure vessel increases. A duty cycle percentage and timescale devoted to a high speed angular velocity of a perforated drum may increase, which may decrease a Nusselt number experienced by a wall of a perforated drum a wall of a pressure vessel, an extraction gas (e.g., FIG. 1, 108), and an extraction mixture.

According to disclosed embodiments, a perforated drum (e.g., FIG. 1, 114) may comprise a filtering layer (e.g., FIG. 1, 132). The filtering layer may desirably partially or substantially prevent a transfer of a natural source through the perforated drum (e.g., FIG. 1, 114). The filtering layer may desirably partially or substantially prevent a transfer of a natural source through a perforated drum during an extraction process (e.g., while a system for extracting organic compounds from a natural source is operating). The filtering layer may be comprised of a polymer, a metal, a metal alloy, a steel, a micro-alloy steel, a steel alloy, a titanium, a nickel alloy (e.g., Monel), or combinations thereof. The polymer may comprise polypropylene, polyethylene, polytetrafluoroethylene, combinations thereof, or copolymers thereof. The filtering layer may comprise polypropylene. The filtering layer may comprise a mesh, a microporous sintered sheet, or combinations thereof. The filtering layer may permit an extraction gas (e.g., FIG. 1, 108) to pass through the filtering layer. The filtering layer may permit an extraction gas to pass through the filtering layer while not permitting at least a portion of a natural source from passing through the filtering layer. The filtering layer may retain a natural source inside a perforated drum. The filtering layer may permit an extraction gas to pass through a perforated drum. The filtering layer may comprise a thickness from about 0.01 cm to about 1.4 cm.

In disclosed embodiments, a perforated drum (e.g., FIG. 1, 114) may comprise a bag, a porous cloth, a metal mesh, a plastic mesh, or a combination thereof. A bag, a porous cloth, a metal mesh, a plastic mesh, or a combination thereof may desirably partially or substantially prevent a transfer of a natural source through the perforated drum.

An inlet of a dynamic extraction vessel (e.g., FIG. 1, 115; FIG. 2, 215) may connect to an outlet of a storage vessel (e.g., FIG. 1, 102; FIG. 2, 202), a product collection vessel (e.g., FIG. 1, 175; FIG. 2, 275), a cleaning solution tank (e.g., FIG. 1, 107), a compressor (e.g., FIG. 1, 176; FIG. 2, 276), or a condenser (e.g., FIG. 1, 181; FIG. 2, 281). In disclosed embodiments, a dynamic extraction vessel may be configured to receive an extraction gas (e.g., FIG. 1, 108) from a storage vessel, a product collection vessel, a cleaning solution tank (e.g., FIG. 1, 107), a compressor, or a condenser.

An extraction chamber (e.g., FIG. 1, 110) may be configured to receive an extraction gas (e.g., FIG. 1, 108) from a storage vessel (e.g., FIG. 1, 102; FIG. 2, 202). The extraction chamber may be configured to have a textured interior surface. The extraction chamber may be configured to have a corrugated interior surface. The corrugated interior surface may comprise a scalloped interior surface. The scalloped interior surface may desirably enable heat transfer between an interior of the extraction chamber and an exterior of the extraction chamber. In disclosed embodiments, an extraction chamber may comprise a pressure vessel (e.g., FIG. 1, 112) inside of the extraction chamber).

According to disclosed embodiments, a dynamic extraction vessel (e.g., FIG. 1, 115; FIG. 2, 215) may comprise a acoustic transducer (e.g., FIG. 1, 144; FIG. 2, 244) (e.g., sonicator). The acoustic transducer may be operated at an ultrasonic frequency (e.g., >20 kHz). Operating the acoustic transducer at a high audio frequency may permit penetration of an extraction gas (e.g., FIG. 1, 108) into a natural source. Compressional waves, secondary waves, shear waves, or S-waves created by the acoustic transducer, when applied to gases, solids, or liquid, may create stable cavitation in between high pressure and low pressure regions within a natural source, which may permit extraction gases to penetrate the natural source at a higher rate that may promote extraction of organic compounds from the natural source. The acoustic transducer may desirably be placed within a wall of a pressure vessel (e.g., FIG. 1, 112), wherein desirable acoustic contact may be maintained during system operating conditions or while a system is not operating.

In some embodiments, a dynamic extraction vessel (e.g., FIG. 1, 115, FIG. 2, 215) may be heated or cooled. For example, the dynamic extraction vessel may be heated or cooled to a temperature from about −196° C. to about 200° C. Heat may be supplied or removed from the dynamic extraction vessel by a heat exchanger (e.g., FIG. 2, 277). Heating or cooling the dynamic extraction vessel may heat or cool all parts of the dynamic extraction vessel, including an extraction chamber, a pressure vessel, a perforated drum, and a drum rotator. Additionally, heating or cooling the dynamic extraction vessel may heat or cool an extraction gas and a natural source contained within the dynamic extraction vessel. In some embodiments, heating or cooling the dynamic extraction vessel may desirably increase or decrease the rate of extraction of at least one organic compound from the natural source.

A perforated drum (e.g., FIG. 1, 114) may comprise a vane (e.g., FIG. 1, 140). The vane may be disposed or arranged on one or more external surface of the perforated drum. The perforated drum may comprise a vane, which may be in proximity to a wall of an extraction chamber (e.g., FIG. 1, 110) in which the perforated drum is contained. The vane may desirably permit gas recirculation cells between an inner wall of an extraction chamber and a drum surface. The geometry of the vane may desirably complement or reflect a scalloping or a corrugation of an interior surface of an extraction chamber. In disclosed embodiments, the vane may desirably allow heat transfer to and from a natural source contained within an extraction chamber. The vane may desirably increase local gas velocity so as to increase heat transfer to and from a natural source contained within an extraction chamber during a step of removing an extraction gas (e.g., FIG. 1, 108) from the natural source. The vane may optimize the heat transfer by promoting the overall turbulence of the extraction gas. This heat transfer may reduce the time required for removing extraction gas under certain conditions, and may therefore be desirable. The vane may comprise a polymer, a metal, a metal alloy, a steel, a micro-alloy steel, a steel alloy, or combinations thereof. In some embodiments, a narrow boundary region of the vane may cause turbulent flow, which may desirably increase heat transfer.

According to disclosed embodiments, a dynamic extraction vessel (e.g., FIG. 1, 115; FIG. 2, 215) may comprise a drum rotator (e.g., FIG. 1, 130). The drum rotator may be configured to permit a perforated drum (e.g., FIG. 1, 114) to rotate about a principal axis (e.g., FIG. 1, 116). The motor may comprise a servo motor, an internal combustion motor, a gear motor, a switch reluctance motor, a hybrid stepper motor, an electrical motor, a hydraulically powered motor, a magnetic motor, a permanent magnet DC motor, a torque motor, a cage and wound rotor induction motor, an electrically excited motor, an ironless or coreless rotor motor, a brush DC motor, a synchronous AC motor, an induction AC motor, a single phase AC motor, a three phase AC motor, a brushless DC motor, or a combination thereof. The drum rotator may comprise a hermetically sealed motor, wherein the drum rotator may be powered hydraulically, by air, by electricity, magnetically, or combinations thereof. The drum rotator may comprise a hydraulic pump, an accumulator tank for pressurized hydraulic fluid, an accumulator tank for low pressure (e.g., 200 psi) hydraulic fluid, a sensor (e.g., pressure sensor), a hydraulic line, or a combination thereof. In disclosed embodiments, the hydraulically powered motor may be contained inside of a hermetic container (e.g., hermetic can), which may desirably obviate a need for a gas tight shaft seal or the drum may be rotated. In some embodiments, the drum may be rotated by a magnetic drive. In disclosed embodiments, a wall of the extraction chamber (e.g., FIG. 1, 110) may comprise a magnetic material or a nonmagnetic material. The hermetic can fitting over a stub shaft armature assembly may comprise a nonmagnetic material, wherein mechanical losses due to induced secondary eddy currents may desirably be minimized According to disclosed embodiments, the dynamic extraction vessel may provide for measurement or control of an angular velocity (e.g., measured rpm) of a perforated drum. A sensor comprising a rotary encoder, a resolver, a tachometer, a rate sensor, a position sensor, or a combination thereof may obtain angular velocity data, wherein the data may be stored by a computer processor in a computer-readable medium. The computer processor may control the angular velocity of the perforated drum instantaneously or through computer-readable instructions stored in the computer-readable medium. Angular velocity may be measured by an optical shaft encoder located on a motor shaft. The encoder may also quantify an instantaneous orientation of a drum relative to a pressure vessel (e.g., FIG. 1, 112).

A drum rotator (e.g., FIG. 1, 130) may desirably permit an extraction gas (e.g., FIG. 1, 108) to be absorbed desirably by a natural source, wherein heat or mechanical energy may permit desirably removal of the extraction gas from the natural source. According to disclosed embodiments, a dynamic extraction vessel (e.g., FIG. 1, 115; FIG. 2, 215) may comprise a boiler loop under control of a computer processor that receives temperature information from a heat sensor, a thermocouple, a passive infrared sensor, or a resistance thermometer. The boiler loop may be a component of a boiler system, wherein the computer processor may adjust settings on the boiler system to adjust the temperature of the boiler loop. Adjusting the temperature on the boiler loop may increase, decrease, or maintain the temperature of the dynamic extraction vessel. The dynamic extraction vessel may comprise an insulation, a coating, or a combination thereof, which may provide a passive temperature control. The dynamic extraction vessel may comprise electric heaters, thermoelectric coolers, or combinations thereof under control of a computer processor. The computer processor may control the electric heaters, thermoelectric coolers, or combinations thereof instantaneously or through computer-readable instructions stored in a computer-readable medium.

Gas-Liquids Separator System: Spray Evaporation Loop System

A system (e.g., FIG. 1, 100; FIG. 2, 200) for extracting organic compounds from a natural source may comprise a gas-liquids separator system. The gas-liquids separator system may recover an extraction gas (e.g., FIG. 1, 108). The gas-liquids separator system may recover an extraction gas in a phase, the phase comprising a gas, a liquid, a supercritical fluid, or a combination thereof.

A gas-liquid separator may comprise a spray evaporation loop system (e.g., FIG. 1, 170; FIG. 2, 270), a wiped film evaporation system (e.g., spinning band evaporator, falling film evaporator), or a combination thereof. In disclosed embodiments, the spray evaporation loop system may comprise an injection nozzle (e.g., a spray nozzle), a flash drum (e.g., FIG. 2, 276), a demisting system (e.g., cyclonic separator), at least one filter (e.g., FIG. 2, 273), a recirculating blower (e.g., FIG. 2, 274), a heat exchanger (e.g., FIG. 2, 277), and an extracted solute, a product collection vessel (e.g., FIG. 1, 175; FIG. 2, 275). In disclosed embodiments, the spray evaporation loop system, may comprise a loop of the flash drum, which may be connected to the cyclonic separator (e.g., FIG. 2, 272), which may be connected to the at least one filter (e.g., FIG. 2, 273), which may be connected to the blower, which may be connected to the heat exchanger (e.g., FIG. 2, 277), wherein the heat exchanger may be connected back to the flash drum.

In disclosed embodiments, an injection nozzle (e.g., FIG. 2, 271) of a spray evaporation loop system (e.g., FIG. 1, 170; FIG. 2, 270), may be connected to an outlet of a dynamic extraction vessel (e.g., FIG. 1, 115; FIG. 2, 215). A delivery pump (e.g., FIG. 1, 182) may control the flow of a solute from a dynamic extraction vessel, to a spray evaporation loop system or an intermediate storage vessel (e.g., FIG. 2, 254). A flash drum (e.g., FIG. 2, 276) may be configured to receive a solute spray from an injection nozzle, wherein a flash drum (e.g., FIG. 2, 276) may feed the solute to a cyclonic separator (e.g., FIG. 2, 272). The solute may be obtained in a relatively pure form from the underflow outlet of the cyclonic separator. The outlet of an intermediate storage vessel may connect to the injection nozzle of the spray evaporation loop system. A delivery pump (e.g., progressive cavity pump) (e.g., FIG. 2, 255) may regulate the flow of an output from the intermediate storage vessel to an injection nozzle of a spray evaporation loop system.

An injection nozzle (e.g., FIG. 2, 271) may comprise a spray nozzle, a plain-orifice nozzle, a shaped orifice nozzle, a surface impingement single-fluid nozzle, a pressure-swirl single-fluid spray nozzle, a solid-cone single fluid nozzle, a compound nozzle, a rotary atomizer, an ultrasonic atomizer, an atomizer nozzle, an air-aspirating nozzle, a swirl nozzle, or combinations thereof. A conduit may comprise a tube, a pipe, or a combination thereof. A conduit may desirably connect components of a spray evaporation loop system (e.g., FIG. 1, 170; FIG. 2, 270). A flash drum (e.g., FIG. 2, 276) may be configured to receive a spray from an injection nozzle. A demisting system (e.g., FIG. 2, 272) may comprise a cyclonic separator. A recirculating blower (e.g., FIG. 2, 274) may comprise a regenerative blower, a roots-type blower, a dry-running screw, a centrifugal blower, and an axial turbine.

A heat exchanger (e.g., FIG. 2, 277) may comprise a gas-to-gas type, a liquid-to-gas type, or a combination thereof. In disclosed embodiments, a heat exchanger connects to a boiler system (e.g., FIG. 2, 290). A heat exchanger may be configured to receive heat from a boiler system. A solute may comprise an extraction gas (e.g., FIG. 1, 108), an organic compound, or a combination thereof. The solute may be obtained in a gas-liquids separator system. For example, the solute may be obtained at a bottom (e.g., underflow outlet) of the cyclonic separator system. In disclosed embodiments, the extraction solvent may be removed. A condenser (e.g., FIG. 1, 181; FIG. 2, 281), a compressor (e.g., FIG. 1, 176; FIG. 2, 276), or a combination thereof may remove an extraction solvent from the solute. A system (e.g., FIG. 1, 100; FIG. 2, 200) for extracting organic compounds from a natural source may comprise a gas-liquids separator system, wherein the gas-liquid separator system may comprise an in-parallel system, an in-series system, or combinations thereof.

A spray evaporation loop system (e.g., FIG. 1, 170; FIG. 2, 270) may evacuate a residual extraction gas from a pressure vessel (e.g., FIG. 1, 112). Evacuation may occur by opening a valve to an intake of a compressor (e.g., FIG. 1, 176; FIG. 2, 276) as the compressor runs. Evacuation may occur by opening a valve to an intake of a gas dryer system (e.g., FIG. 1, 180; FIG. 2, 280). The gas dryer system may discharge the extraction gas to the compressor, which may discharge the extraction gas through a condenser and return the extraction gas (e.g., FIG. 1, 108) through a liquid return line valve and to a storage vessel (e.g., FIG. 1, 102; FIG. 2, 202). A spray evaporation loop system (e.g., FIG. 1, 170; FIG. 2, 270) may comprise a delivery pump (e.g., FIG. 1, 182) to deliver the extraction gas to the gas dryer system or may optionally use gravity alone to deliver the extraction gas to the gas dryer system.

According to disclosed embodiments, a spray evaporation loop system (e.g., FIG. 1, 170, FIG. 2, 270) may comprise sensors comprising thermal sensors, volume pressures, pressure sensors, chemical sensors, moisture sensors, or combinations thereof, which may obtain data that may be stored as a computer-readable medium in a computer processor. The computer processor may control the temperature, volume, pressure, or a combination thereof of the spray evaporation loop system instantaneously or through computer-readable instructions stored in the computer-readable medium.

In some embodiments, a spray evaporation loop system (e.g., FIG. 1, 170, FIG. 2, 270) may be heated or cooled. For example, the spray evaporation loop system may be heated or cooled to a temperature from about −196° C. to about 200° C. Heat may be supplied or removed from the dynamic extraction vessel by a heat exchanger (e.g., FIG. 2, 277). Heating or cooling the spray evaporation loop system may heat or cool all parts of the spray evaporation loop system. Additionally, heating or cooling the spray evaporation loop system may heat or cool an extraction gas and an extracted solute contained within the spray evaporation loop system.

Product Collection Vessel

According to disclosed embodiments, a system for extracting organic compounds from a natural source may comprise a product collection vessel (e.g., FIG. 1, 175; FIG. 2, 275). The product collection vessel may be configured to receive an organic compound from a spray evaporation loop system (e.g., FIG. 1, 170; FIG. 2, 270). For example, an outlet of the spray evaporation loop system may connect to an inlet of the product collection vessel. Specifically, an outlet of an outlet of a cyclonic separator (e.g., FIG. 2, 272) may be connected to an inlet of the product collection vessel. The product collection vessel may comprise a polymer, a glass, a metal, a metal alloy, a steel, a micro-alloy steel, a steel alloy, or a combination thereof.

In disclosed embodiments, a product collection vessel (e.g., FIG. 1, 175; FIG. 2, 275) may receive the product from the (non volatile) concentrate from the underflow outlet of the cyclone or alternatively from the bottom of the separation vessel of a wiped film evaporator. For example, if an organic compound collected in the product collection vessel is not desirably devoid of a portion of the extraction gas, the gas dryer system may collect the portion of the extraction gas from the organic compound. The product collection vessel may comprise a 2-way solenoid valve (e.g., FIG. 2, 251), a 3-way solenoid valve (e.g., FIG. 2, 253), or a combination thereof. In disclosed embodiments, the way solenoid valve, the 3-way solenoid valve, or a combination thereof, may desirably regulate [under control of a computer processor and its associated computer-implemented instructions] the rate at which the gas dry system collects a portion of the extraction gas from an organic compound.

Gas Dryer System

In disclosed embodiments, a system (e.g., FIG. 1, 100; FIG. 2, 200) for extracting organic compounds from a natural source may comprise a gas dryer system (e.g., FIG. 1, 180; FIG. 2, 280). An outlet of the gas dryer system is connected to an inlet of a compressor (e.g., FIG. 1, 176; FIG. 2, 276), wherein the flow may be regulated by a vacuum pump (e.g., FIG. 1, 150). The gas dryer system may comprise a purification subsystem. The gas dryer system may comprise a desiccant assembly (e.g., FIG. 2, 261), wherein the desiccant assembly may comprise a desiccant packed tower (e.g., column) comprising a desiccant. An outlet of the compressor may connect to an inlet system (e.g., FIG. 1, 160) of a dynamic extraction vessel (e.g., FIG. 1, 115) or an inlet of a condenser (e.g., FIG. 1, 181; FIG. 2, 281). An outlet of the condenser, may connect to an inlet of a storage vessel (e.g., FIG. 1, 102; FIG. 2, 202), an inlet of a dynamic extraction vessel (e.g., FIG. 1, 115; FIG. 2, 215), an inlet of a gas dryer system, or a combination thereof. The desiccant assembly may comprise more than one desiccant packed tower packed in a series arrangement, in a parallel arrangement, or a combination thereof. The desiccant may comprise calcium oxide, calcium sulfate, magnesium sulfate, sodium sulfate, sulfuric acid, a zeolite, a porous glass, a clay, an activated carbon, a mesoporous silica, glycerol, a macroporous silica, alumino-silicate, molecular sieves, a $C_2$-$C_6$ glycol, calcium chloride, or combinations thereof. The desiccant may absorb water from an extraction gas (e.g., FIG. 1, 108).

In disclosed embodiments, a gas dryer system (e.g., FIG. 1, 180; FIG. 2, 280) may be used to remove moisture from a system (e.g., FIG. 1, 100; FIG. 2, 200) before operation of the system, during operation of a system, after operation of a system, or a combination thereof. The gas dryer system may reduce a moisture content from an extraction gas (e.g., FIG. 1, 108) to less than about 100 ppm, or less than about 50 ppm, or less than about 10 ppm, or less than about 1 ppm, or less than about 0.1 ppm, or less than about 0.01 ppm, or less than about 0.001 ppm. Reducing the moisture content of the extraction gas may desirably permit extracting of moisture sensitive organic compounds from the natural source. In disclosed embodiments, reducing the moisture content of the extraction gas may adjust the polarity of the extraction gas. Reducing the moisture content of the extraction gas may reduce the polarity or increase the polarity of an extraction gas. Reducing or increasing the polarity of an extraction gas through moisture reduction may desirably allow the extraction of organic compounds in various hydrophilicities which may be present from the natural source. The moisture of the extraction gas may be reduced so that the extraction gas is anhydrous or substantially anhydrous. For example, a moisture content may comprise below about 1000 ppm, or below about 900 ppm, or below about 800 ppm, or below about 700 ppm, or below about 600 ppm, or below about 500 ppm, or below about 400 ppm, or below about 300 ppm, or below about 200 ppm, or below about 100 ppm. The gas dryer system may comprise volume sensors, temperature sensors, pressure sensors, moisture sensors, chemical sensors, or combinations thereof that may transfer data that may be stored by a computer processor in a computer-readable medium. The computer processor may control the gas dryer instantaneously or through computer-readable instructions stored in the computer-readable medium.

Compressor

In disclosed embodiments, a system for extracting organic compounds from a natural source may comprise a compressor (e.g., FIG. 1, 176; FIG. 2, 276). The compressor may comprise a reciprocating compressor, a scroll compressor, a screw compressor, a rotary compressor, a centrifugal compressor, a positive displacement compressor, a dynamic compressor, an air bubble compressor, a diagonal or mixed-flow compressor, an axial flow compressor, a hermetically sealed, open, or semi-hermitic compressor, or a combination thereof. The compressor may recover an extraction gas (e.g., FIG. 1, 108). The compressor may be in gaseous or fluid communication with a condenser (e.g., FIG. 1, 181; FIG. 2, 281), an inlet system (e.g., FIG. 1, 160) of a dynamic extraction vessel (e.g., FIG. 1, 115; FIG. 2, 215), a gas dryer system (e.g., FIG. 1, 180; FIG. 2, 280), a storage vessel (e.g., FIG. 1, 102; FIG. 2, 202), or combinations thereof. For example, an outlet of a gas dryer system is connected to an inlet of a compressor, wherein the flow may be regulated by a vacuum pump (e.g., FIG. 1, 150).

A compressor (e.g., FIG. 1, 176; FIG. 2, 276) may facilitate a movement of an extraction gas throughout a system (e.g., FIG. 1, 100; FIG. 2, 200) for extracting organic compounds from a natural source. In disclosed embodiments, a vacuum pump (e.g., FIG. 1, 150) may transport an extraction gas (e.g., anhydrous extraction gas) from a gas dryer system (e.g., FIG. 1, 180; FIG. 2, 280) to the compressor, or from the compressor, to the gas dryer system. For example, the compressor may transport a dried extraction gas from a gas dryer system to a storage vessel (e.g., FIG. 1, 102; FIG. 2, 202). In disclosed embodiments, the compressor may transport a dried extraction gas from a gas dryer system to the inlet system (e.g., FIG. 1, 160) of a dynamic extraction vessel (e.g., FIG. 1, 115; FIG. 2, 215).

Boiler System

In disclosed embodiments, the present disclosure relates to a system (e.g., FIG. 1, 100; FIG. 2, 200) for extracting organic compounds from a natural source, the system comprising a boiler system (e.g., FIG. 2, 290). The boiler system may comprise a boiler (e.g., FIG. 2, 291), a pressure relief valve (e.g., FIG. 2, 292), a site gauge (e.g., FIG. 2, 293), a y-strainer (e.g., FIG. 2, 294), a pump (e.g., FIG. 2, 295), a de-aerator (e.g., FIG. 2, 296), and a water storage tank (e.g., FIG. 2, 297). The boiler system may provide heat or heat exchange throughout a system for extracting organic compounds from a natural source. For example, a boiler system may connect to a dynamic extraction vessel (e.g., FIG. 1, 115; FIG. 2, 215) and a spray evaporation loop system (e.g., FIG. 1, 170; FIG. 2, 270) through a heat loop. The heat loop may provide heat or exchange heat with the dynamic extraction vessel (e.g., FIG. 1, 115; FIG. 2, 215) or the spray evaporation loop system. The boiler system may comprise a fire-tube boiler, a water-tube boiler, a high-pressure boiler (e.g., boiler with >15 psig), a low-pressure boiler (e.g., boiler with <15 psig), a steam boiler, a hot water boiler, or combinations thereof. The boiler system may comprise a loop of the boiler connected to the pressure relieve valve, which may be connected to the site gauge, wherein the site gauge may be connected to the y-strainer, wherein the y-strainer may be connected to the de-aerator, which may be connected to a water storage tank, which may connect back to the boiler.

Sensor System

The present disclosure relates, according to disclosed embodiments, to a system (e.g., FIG. 1, 100; FIG. 2, 200) for extracting organic compounds from a natural source, the system comprising a system of sensors (e.g., temperature, pressure, volume, chemical, and fluid). The system of sensors may monitor or control a temperature, a pressure, a volume, a water content, a gas level, a chemical composition of an extraction gas (e.g., FIG. 1, 108) and a solute, or a combination thereof. Sensors may desirably transfer data to a computer processor, wherein the data may be stored by the computer processor in a computer-readable medium. The system of sensors may desirably analyze a composition of the extraction gas, a natural source, a solute, or a combination thereof. The system of sensors may comprise a separation system comprising gas chromatography, ultra-high performance liquid chromatography, high performance liquid chromatography, liquid chromatography, column chromatography, reverse phase chromatography, normal phase chromatography, ion exchange chromatography, size-exclusion chromatography, or combinations thereof. The separation system may optionally be coupled to the detection system, wherein the detection system may comprise a spectrometer (e.g., mass spectrometer). For example, the separation system may optionally be coupled to a single quadruple mass spectrometer. Feedback from the spectrometer may be used to adjust amounts of the extraction gas (e.g., FIG. 1, 108) or an amount of a solute. A time of flight mass spectrometer may be employed for analysis of specific components in complex natural product mixtures. Miniaturized mass spectrometer systems which are economically designed for process work are manufactured and can be employed in this system advantageously. Feedback from the spectrometer in the form of an electrical signal proportional to the relative concentration of a desired component present in the extraction mixture may be dynamically used to adjust either the amounts of an extraction gas (e.g., FIG. 1, 108), in the form of the total pressure of the extraction gas or the partial pressure of a particular component of the said extraction gas mixture, or alternatively can be used to adjust addition of a given amount of an organic liquid to the extraction process which is used as an additional solute. This would typically be added with the aid of a metering pump.

Sample Cell

A system (e.g., FIG. 1, 100; FIG. 2, 200) for extracting an organic compound from a natural source may comprise a cell, wherein the cell may comprise a glass window, a sapphire window, and a quartz window. The cell may be 180 degrees opposite, 90 degrees opposite, or combinations thereof. The cell may desirably permit an analysis of an extraction gas (e.g., FIG. 1, 108) or a solute by methodologies comprising ultraviolet absorption spectroscopy, infrared absorption spectroscopy, tetrahertz absorption spectroscopy, time domain spectroscopy, Raman spectroscopy, fluorescence spectroscopy, microwave multiple resonance spectroscopy, cavity ring-down spectroscopy, multiphoton spectroscopy, or combinations thereof. The cell may alternatively comprise a electrical feedthrough, wherein the electrical feedthrough may allow measurement of an electrical parameter comprising conductivity, resistance, capacitance, or dielectric relaxation. An electrical feedthrough may desirably permit an oxidation process, a reduction process, or combinations thereof. The electrical feedthrough may desirably permit performing cyclic voltammetry, controlled-potential coulometry, or spectroelectrochemistry (e.g., using a cell to allow the input or exit of light). In some embodiments, the windows may allow light to be transmitted through the cell allowing spectroscopy to be carried out according to the methods enumerated above. In the case of terahertz spectroscopy, the windows may need to be as thin as are allowed and thus could be made of any thin dielectric material compatible with the frequency of the terahertz radiation. For UV or Visible absorption or fluorescence spectroscopy, the windows may comprise glass, quartz, sapphire, or combinations thereof. Alternatively, a fiber optic material, either fused silica or glass, could be placed within the cell by means of appropriate feedthroughs well known to one having ordinary skill in the art. These fiber optical fibers may then be used to transmit light into the medium within the cell and detect light either emitted within cell by the exciting light carried into it, or determine the amount of light of any particular wavelength which is absorbed by the contents of the cell. These quantities, namely the absorbance and fluorescence, may then be directly related to the concentration of a known fluorescent or absorbing material at any particular wavelength by appropriately calibrating the system by well known methods. Thus, monitoring the output from such a system provides a dynamic measure of the concentration of a particular component in this system. For a simple system of a few discrete components this is straightforward, but for a complex natural product mixture it is not straightforward. Therefore, generally for complex systems such as are utilized within the context of the present invention multiple wavelengths of light are used simultaneously, thereby allowing the measurement of absorbance at multiple wavelengths at the same time. A different approach to this described above would utilize two or more narrow band lasers to probe the system, allowing two or more photons to excite a single molecule of a component which is present. Under certain sets of circumstances well known to one normally skilled in the art, multiphotonic absorption bands can be much narrower than the ground state excitation bands, allowing greater sensitivity in complex mixtures.

Processor/Control System

The present disclosure relates, according to disclosed embodiments, to a system for extracting organic compounds from a natural source, the system comprising a processor or control system. The processor or control system may include a computer processor or other electronic hardware (e.g., a programmable processing unit, memory, random-access memory, a network interface controller, a motherboard, a input device, and a output device). Sensors may provide the computer processor with data, wherein the data may be stored by the computer processor in a computer-readable medium. The control system may comprise a signal converter (e.g., analog to digital or digital to analog converters). A control system may desirably allow a multiplicity of analog outputs from a transducer of pressure, temperature, volume, composition, or combinations thereof, wherein a analog output may be monitored during the course a method of extracting an organic compound from a natural source. The control system may comprise a input from a monitoring subsystem (e.g., mass spectrometers, optical absorption devices, and other spectroscopic monitors, etc.). The monitoring subsystem may be dynamically monitored by the control system, which may be located at any point in the system. For example, the processor or control system may be located close to an outlet of an extraction vessel.

A computer processor may execute one or more algorithms, wherein the one or more algorithms may define process control parameters. For example, the computer processor may control a component of a system (e.g., FIG. 1, 100, FIG. 2, 200) instantaneously or through computer-readable instructions (e.g., algorithm) stored in the computer-readable medium. An algorithm may define a system or method of desirable pressure, temperature, or extraction gas (e.g., FIG. 1, 108) concentrations, wherein the system and or method may desirably produce a solute. A control system may control a level of powering to an acoustic or ultrasonic transducer, and a rotation speed of a perforated drum (e.g., FIG. 1, 114). The control system may be desirably filtered or buffered to reduce an electrical noise. The control system may comprise optical fibers, wherein the optical fibers may couple to a sensor output to an analog input of an analog-to-digital (AD) converter, which may reduce electrical noise. In disclosed embodiments, the control system may desirably adjust a power to a component of a system for extracting organic compounds from a natural source. Power may be adjusted by increasing, decreasing, or maintaining a current, a voltage, a duty cycle, or a combination thereof to a component of a system for extracting organic compounds from a natural source.

A system (e.g., FIG. 1, 100; FIG. 2, 200) for extracting organic compounds from a natural source may comprise a single power source. For example, a power source may comprise a single phase or a three phase alternating current, wherein the power source may contain a variety of transformers to provide lower AC voltages (e.g., 220 V, 110 V), or DC power supplies to power a transducer and a indicator.

Cleaning System

The present disclosure relates, according to disclosed embodiments, to a system for extracting organic compounds from a natural source, the system comprising a cleaning system. The cleaning system may comprise a cleaning solution supply tank (e.g., FIG. 1, 107), wherein the cleaning solution supply tank may comprise a solvent comprising acetone, acetonitrile, water, chloroform, dichloromethane, ethyl acetate, ethanol, heptane, diethyl ether, dimethyl sulfoxide, toluene, methanol, hexanes, acetic acid, hydrochloric acid, pyridine, trimethylamine, or combinations thereof. The cleaning solution supply tank may be in fluid communication with a dynamic extraction vessel (e.g., FIG. 1, 115; FIG. 2, 215), a storage vessel, a compressor (e.g., FIG. 1, 176; FIG. 2, 276), a condenser (e.g., FIG. 1, 181; FIG. 2, 281), or combinations thereof. An outlet of the cleaning solution supply tank may be connected to an inlet of a dynamic extraction vessel. A cleaning solution supply pump (e.g., FIG. 1, 109) may regulate the flow of the cleaning solution from the cleaning solution supply tank to the dynamic extraction vessel. Cleaning a system for extracting an organic compound from a natural source may comprise removing a spent source material from the system. Cleaning may remove a residue from a component of a system. A spent source may be transferred to a fixed tank, wherein the spent source may be analyzed, dried, recycled, re-extracted, or combinations thereof. For example, a secondary extraction of organic compounds from a spent source may be performed. This could be comprised of a system containing an additional tank, wherein the spent source could be further extracted with an additional organic solvent. In some embodiments, ethanol could be used to as the additional solvent to further extract materials from the spent source. A secondary extraction may be performed in an enfleurage tank, wherein a slow extraction may be performed. In disclosed embodiments, a secondary extraction may extract additional organic compounds may be extracted from a spent source, which may not have been extracted in the initial extraction process. A secondary extraction may comprise solvents used in the initial extraction process, solvents not used in the initial extraction process, or combinations thereof. The cleaning system may comprise pressure sensors, chemical sensors, moisture sensors, temperature sensors, or a combination thereof that may transfer data that may be stored by a computer processor in a computer-readable medium. The computer processor may control components of the cleaning system instantaneously or through computer-readable instructions stored in the computer-readable medium.

Intermediate Storage Vessel

In disclosed embodiments, the present disclosure relates to a system for extracting an organic compound from a natural source, the system comprising an intermediate storage vessel (e.g., FIG. 2, 254). The intermediate storage vessel may store a solute. The intermediate storage vessel may be configured to receive a solute from a dynamic extraction vessel (e.g., FIG. 2, 215). In disclosed embodiments, the intermediate storage vessel may be configured to provide a spray evaporation loop system (e.g., FIG. 1, 170; FIG. 2, 270) with a solute.

Inlets and Outlets

In disclosed embodiments, the present disclosure relates to systems for extracting organic compounds from a natural source, wherein the system comprises inlets and outlets. The inlets and outlets may comprise any fitting used in plumbing. For example, the inlets and outlets may comprise valves, unions, plugs, caps, diverter tees, slip-joint fittings, fasteners, elbows, couplers, nipples, expanders, bushings, tees, crosses, barbs, gates, or combinations thereof. Valves may comprise hydraulic, pneumatic, manual, solenoid, and motor valves. Valves may comprise ball valves, butterfly valves, check valves, diaphragm valves, gate valves, needle valves, pinch valves, piston valves, poppet valves, sampling valves, safety valves, ball cock, bibcock, or combinations thereof. Inlets and outlets may comprise both male and female threaded connectors (e.g., pipes). Inlets and outlets may comprise metals (e.g., stainless steel and copper) and polymers (e.g., polyethylene).

Methods for Extracting Organic Compounds

The present disclosure relates, according to disclosed embodiments, to methods for extracting organic compounds from a natural source. The method for extracting organic compounds from a natural source may comprise (a) combining a primary extraction gas in a storage vessel (e.g., FIG. 1, 102; FIG. 2, 202) to form an extraction gas (e.g., FIG. 1, 108); (b) combining the extraction gas with a natural source in a dynamic extraction vessel (e.g., FIG. 1, 115; FIG. 2, 215), to form an extraction mixture, (c) rotating the perforated drum (e.g., FIG. 1, 114) containing the extraction mixture to form a spent natural source and a solute, wherein the solute comprises an organic compound and at least a portion of the extraction gas; (d) separating the solute from the spent natural source to form a separated solute and a separated spent natural source; (e) recovering at least a portion of the separated solute in a spray evaporation loop system (e.g., FIG. 1, 170; FIG. 2, 270) to form a recovered solute comprising at least a portion of the extraction gas and at least a portion of the organic compound, (g) recovering at least a portion of the extraction gas from the recovered solute with a gas dryer system (e.g., FIG. 1, 180; FIG. 2, 280) to form a recovered extraction gas and a dried organic compound, wherein the dried organic compound is substantially free of the extraction gas; and (h) recycling the recovered extraction gas to form a recycled extraction gas.

In disclosed embodiments, a method for extracting organic compounds from a natural source may comprise charging a storage vessel (e.g., FIG. 1, 102; FIG. 2, 202) with an extraction gas (e.g., FIG. 1, 108) to form a charged extraction gas. Charging may comprise adding an extraction gas to a storage vessel. Charging may comprise charging the extraction gas, wherein the extraction gas is in a gaseous state at a pressure from about 1 ATM to about 30 ATM, and at a temperature of about 20° C. Charging may comprise charging the extraction gas, wherein the extraction gas in a phase, the phase comprising a gas, a liquid, a supercritical fluid, or a combination thereof. Charging may comprise charging the extraction gas (e.g., FIG. 1, 108) at a pressure from about 40 psig to about 5000 psig. For example, the extraction gas may be charged at a pressure from about 40 psig to about 150 psig, or from about 150 psig to about 500 psig, or from about 500 psig to about 1000 psig, or from about 1000 psig to about 2000 psig, or from about 2000 psig to about 3000 psig, or from about 3000 psig to about 4000 psig, or from about 4000 psig, to about 5000 psig. Charging may comprise charging an extraction gas, wherein the extraction gas as a compressed gas (e.g., liquefied gas, non-liquefied gas, and dissolved gas).

According to disclosed embodiments, a method for extracting organic compounds from a natural source may comprise premixing an extraction gas (e.g., FIG. 1, 108) (e.g., charged extraction gas) to form a premixed extraction gas. Premixing the extraction gas may be performed before, during, or after the extraction gas is received by an extraction chamber (e.g., FIG. 1, 110). Premixing may be achieved externally to a storage vessel (e.g., FIG. 1, 102; FIG. 2, 202). For example, premixing may be achieved by one or more sub-systems, such as by a manifold including one or more valves (e.g., Coriolis-type mass flowmeters or duty cycle-controlled proportioning valves). Premixing the extraction gas may desirably enable proportioning of mixture of the extraction gas in a dynamic equilibrium, the dynamic equilibrium comprising concentration, state, pressure, temperature, or combinations thereof.

In disclosed embodiments, a method for extracting organic compounds from a natural source may comprise combining an extraction gas (e.g., FIG. 1, 108) with a natural source to form an extraction mixture. Combining may be performed in a dynamic extraction vessel (e.g., FIG. 1, 115; FIG. 2, 215), wherein the dynamic extraction vessel comprises an extraction chamber (e.g., FIG. 1, 110); a pressure vessel (e.g., FIG. 1, 112); a perforated drum (e.g., FIG. 1, 114); a drum rotator (e.g., FIG. 1, 130); and a temperature adjusting system.

According to disclosed embodiments, a method for extracting an organic compound from a natural source may comprise rotating a perforating drum containing an extraction mixture to form a spent natural source and a solute. A rotating (e.g., tumbling) action may desirably permit penetration of an extraction gas (e.g., FIG. 1, 108) into a natural source. The rotating (e.g., tumbling) action may desirably permit evacuation of an extraction gas or an organic compound from a natural source. The solute may comprise an organic compound and the extraction gas. Rotating may comprise rotating at an angular velocity from about 10 revolutions per minutes to about 400 revolutions per minute. For example, rotating may comprise an angular velocity from about 10 revolutions per minute to about 50 revolutions per minute, or form about 50 revolutions per minute to about 100 revolutions per minute, or from about 100 revolutions per minute to about 200 revolutions per minute, or from about 200 revolutions per minute to about 300 revolutions per minute, or from about 300 revolutions per minute to about 400 revolutions per minute. In disclosed embodiments, rotating the perforating drum containing an extraction mixture may further comprise heating the perforating drum containing the extraction mixture. Rotating the perforating drum containing an extraction mixture may further comprise cooling the perforating drum containing the extraction mixture. Rotating the perforating drum containing an extraction mixture may further comprise increasing (e.g., heating), lowering (e.g., cooling), or maintaining a temperature of the perforating drum containing the extraction mixture. Heating, cooling, or maintaining a temperature during a rotating of a drum containing an extraction mixture may desirably increase efficiency (e.g., yield) or selectivity (e.g., purity) of the method of extracting an organic compound from a natural source.

Rotating a perforating drum containing a perforating drum containing an extraction mixture may comprise rotating while at a temperature from about 0° C. to about 200° C. Rotating the perforating drum containing an extraction mixture may comprise rotating at a pressure from about 50 psig to about 5000 psig. Rotating the perforating drum containing an extraction mixture may comprise sonicating the extraction mixture. Sonicating may comprise treating the extraction mixture with an ultrasonic frequency (e.g., >20 kHz). Sonicating may be performed continuously, intermittently, or singularly.

A method for extracting an organic compound from a natural source may comprise recovering at least a portion of an extraction gas (e.g., FIG. 1, 108) from a solute. Recovering the at least a portion of the extraction gas from a solute may form a recovered extraction gas and a dried organic compound, wherein the dried organic compound is substantially free of the extraction gas. Recovering may be performed by a spray evaporation loop (e.g., spray evaporation system). The spray evaporation loop may comprise an injection nozzle, a flash drum, a demisting system, a recirculating blower, a heat exchanger, a conduit, and a solute (e.g., an extracted solute). At least a portion of an extraction gas may be extracted from a solute. At least a portion may comprise greater than about 5 wt. %, or greater than about 10 wt. %, or greater than about 15 wt. %, or greater than about 20 wt. %, or greater than about 25 wt. %, or greater than about 30 wt. %, or greater than about 35 wt. %, or greater than about 40 wt. %, or greater than about 50 wt. %, or greater than about 55 wt. %, or greater than about 60 wt. %, or greater than about 65 wt. %, or greater than about 70 wt. %, or greater than about 75 wt. %, or greater than about 80 wt. %, or greater than about 85 wt. %, or greater than about 90 wt. %, or greater than about 95 wt. %, by weight of the solute.

In disclosed embodiments, a method for extracting an organic compound from a natural source may comprise analyzing a solute, analyzing a concentrated organic compound, analyzing a natural source, analyzing an extraction gas (e.g., FIG. 1, 108), or a combination thereof. Analyzing may comprise determining an identity or a purity of a solute, analyzing a dried organic compound, analyzing a natural source, analyzing an extraction gas, or combinations thereof. Analyzing may be performed by a sensor system.

In disclosed embodiments, a method for extracting an organic compound from a natural source may comprise recycling a recovered extraction gas (e.g., FIG. 1, 108) to form a recycled extraction gas. A compressor (e.g., FIG. 1, 176; FIG. 2, 276) may be included to recycle a recovered extraction gas. Recycling may comprise dying or storing a recycled extraction gas. A compressor may comprise a storage vessel (e.g., FIG. 1, 102; FIG. 2, 202) or recycling vessel, wherein a recovered extraction gas may be stored.

According to disclosed embodiments, a spent source may be transferred to a fixed tank, wherein the spent source may be analyzed, dried, recycled, re-extracted, or combinations thereof. For example, a secondary extraction of organic compounds from a spent source may be performed. A secondary extraction may be performed in an enfleurage tank, wherein a slow extraction may be performed. In disclosed embodiments, a secondary extraction may extract additional organic compounds may be extracted from a spent source, which may not have been extracted in the initial extraction process. The secondary extraction may comprise solvents used in the initial extraction process, solvents not used in the initial extraction process, or combinations thereof.

In disclosed embodiments, a method for extracting an organic compound from a natural source may comprise an extraction gas (e.g., FIG. 1, 108). An extraction gas may comprise a chlorofluorocarbon, a chlorofluoroolefin, a hydrochlorofluorocarbon, a hydrochlorofluoroolefin, a hydrofluorocarbon, a hydrofluoroolefin, a perfluorocarbon, a perchlorocarbon, a hydrocarbon, a haloalkane, a hydrocarbon, or a combination thereof. A method may comprise a natural source, wherein the natural source is a plant selected from the group consisting of *Piper* spp., *Cannabis* spp., *Salvia* spp., *Banisteriopsis* spp., *Psychotria* spp., *Diplopterys* spp., *Peganum* spp., and *Humulus* spp. In disclosed embodiments, a natural source is *Cannabis sativa*. The natural source may be selected from the group consisting of *Banisteriopsis* caapi, *Psychotria viridis* (chacruna), *Diplopterys* cabrerana, *Peganum harmala*, and *Humulus lupulus*.

Specific Example Embodiments

Specific example embodiments of systems and methods for extracting organic compounds from natural sources are illustrated in FIGS. 1-2. As shown, FIG. 1 illustrates a system 100 for extracting organic products according to specific example embodiments of the disclosure. The system 100 may comprise a primary tank system 101 comprising primary tanks 103, wherein the primary tanks comprise an outlet connected to an inlet of a valve manifold 104. An outlet of the valve manifold 104 may be connected to an inlet of a valve 106. An outlet of valve 106 may connect to an inlet of a storage vessel 102. In disclosed embodiments, the primary tanks may comprise a primary extraction gas, wherein they may be premixed before entering the storage vessel. Premixing more than one primary extraction gas in this configuration may form an extraction gas with desirable homogeneity. An extraction gas mixture with a desirable homogeneity may promote efficiency, accuracy, or precision during an extraction process. Premixing more than one primary extraction gas may allow control over combined extraction gas characteristics such as polarity, density, dielectric constant, and miscibility. Premixing may also occur externally to the system 100.

According to disclosed embodiments, as illustrated in FIG. 1, an outlet of a storage vessel 102 may connect to an inlet of a dynamic extraction vessel 115, wherein a valve may regulate the flow of an extraction gas 108 from the storage vessel 102 to the dynamic extraction vessel 115. The regulator may optionally supply and control delivery of an inert gas, if required, for an extraction method, wherein the inert gas may comprise helium, argon, nitrogen, neon, carbon dioxide, xenon, krypton, or combinations thereof. The dynamic extraction vessel 115 may comprise an extraction chamber 110, a natural source, a pressure vessel 112, a drum rotator 130, a temperature adjusting control element, and a perforated drum 114. The extraction chamber 110 may be concentrically contained within the pressure vessel 112. The perforated drum 114 may be substantially cylindrical in shape and may be concentrically contained within the extraction chamber 110 and within the pressure vessel 112. In disclosed embodiments, the extraction chamber 110, pressure vessel 112, and perforated drum 114 may be aligned about a principle axis 116. The perforated drum 114 may be configured to rotate about the principle axis 116. The drum rotator 130 may regulate the rotational velocity of the perforated drum 114 about the principle axis 116. The mechanical energy used in rotating the perforated drum 114 at a rotational velocity may desirably permit mixing of an extraction medium with a natural source, which may increase the selectivity or efficiency of extracting an organic compound from the natural source, a spent source, or a combination thereof.

An outlet of a dynamic extraction vessel 115 may connect to or be in gaseous communication with an air removal vessel 119, wherein the pressure or volume of an extraction gas 108 may be regulated by an evacuation vacuum pump 117. In disclosed embodiments, the evacuation vacuum pump 117 may evacuate the dynamic extraction vessel 115 of air, extraction gas 108, or moisture prior to extraction. Removing moisture from the dynamic extraction vessel 115 may desirably permit extractions of organic compounds that may be sensitive to moisture or wherein the natural source may be sensitive to moisture.

According to disclosed embodiments, a perforated drum 114 may comprise vanes 140, which may be disposed or arranged on one or more parts of an external surface of the perforated drum in proximity to the walls of the extraction chamber 110. Vanes 140 may advantageously permit the formation of recirculation cells between the inner wall of the extraction vessel 110 and the surface of the perforated drum 114 as the drum rotates, which may increase heat transfer. Recirculation cells may desirably enhance heat transfer to the inside of the extraction chamber 110. In disclosed embodiments, the perforated drum 114 may comprise a filtering layer 132, which may desirably partially or substantially prevent a transfer of a natural source through the perforated drum 114, thereby increasing the efficiency or selectivity of the system 100.

In disclosed embodiments, a dynamic extraction vessel 115 may comprise a recirculation pump 152, wherein the recirculation pump 152 may enhance circulation or recirculation of an extraction gas/liquid/supercritical fluid mixture during an extraction process through the extraction chamber 110. During the recirculation, samples may be taken from the extraction fluid to perform an analysis on the extract. For example, the analysis may comprise analyzing with a UV-VIS-NIR spectrometer, an FTIR spectrometer, a GC, an MS, a HPLC, an HPLC-MS, or a combination thereof. The system 100 according to FIG. 1 advantageously permits an analysis to be performed in-line or by removing a sample during an extraction process. Recirculation may also enhance flow of the extraction gas 108 through the extraction vessel 110.

As shown in FIG. 1, a dynamic extraction vessel 115 may comprise an acoustic transducer 144. The acoustic transducer 144 may advantageously be placed within the walls of the pressure vessel 112, which may permit a high audio frequency penetration during an extraction process. High audio frequency penetration during an extraction process may desirably increase extraction efficiency or selectivity. Also, the high audio frequency penetration may facilitate cleaning of the dynamic extraction vessel 115 during a cleaning process.

An inlet of a dynamic extraction vessel 115 may be connected to a cleaning solution supply tank 107, wherein the flow of a cleaning solution from the cleaning solution supply tank 107 to the dynamic extraction vessel 115 may be regulated by a cleaning solution supply pump 109. Cleaning solution supplied by the cleaning solution supply tank 107 may permit cleaning of a system 100 or the dynamic extraction vessel 115. Cleaning of the system 100 or the dynamic extraction vessel 115 may desirably prolong the life or efficiency of the system 100 or the dynamic extraction vessel 115. Cleaning of the system 100 or the dynamic extraction vessel 115 may advantageously reduce a risk of decomposition of organic compounds due to contact with a contaminant.

According to disclosed embodiments, as shown in FIG. 1, an outlet of a dynamic extraction vessel 115 may be connected to, in fluid communication, or in gaseous communication with an inlet of a spray evaporation loop system 170. The spray evaporation loop system 170 may be configured to receive a solute form the dynamic extraction vessel 115 in a liquid, gaseous, or supercritical fluid form. The flow or pressure of a solute from the dynamic extraction vessel 115 to the spray evaporation loop 170 may be regulated by a delivery pump 182. The spray evaporation loop system 170 may desirably solidify an organic compound or a defined mixture of organic compounds. In disclosed embodiments, solidification of an organic compound may desirably produce a pure organic compound that may not need further purification (e.g., chromatography). For example, recrystallization or solidification may produce a pure organic compound that is greater than about 85% pure, or greater than about 90% pure, or greater than about 95% pure, or greater than about 98% pure, or greater than about 99% pure, by weight of the pure organic compound. The system 100 disclosed in FIG. 1 advantageously permits the spray evaporation loop system 170 to be configured to purify or collect an extracted product in flow or in batch. Purifying in flow may permit the scaling out of an extraction process.

In disclosed embodiments, an outlet of a spray evaporation loop system 170 may be connected to an inlet of a product collection vessel 175. An outlet of the spray evaporation loop system 170 may be connected to an inlet of a gas dryer system 180. An outlet of a product collection vessel 175 may be connected to an inlet of a dynamic extraction vessel 115 or an inlet of the gas dryer filter 180. The gas dryer system 180 may desirably recycle or purify an extraction gas 108 from the spray evaporation loop system 170 or the product collection vessel 170, which may promote a dryer or more pure extraction product (i.e., organic compound). Recycling of the extraction gas 108 may desirably reduce waste, increase yield efficiency, or increase cost efficiency of a system 100. The extraction gas 108 may also be returned or recycled from the spray evaporation loop system 170 or the product collection vessel 170 to the dynamic extraction vessel 115, wherein it may continue to extract organic compounds from a natural source. An outlet of the gas dryer system 180 may connect to an inlet of a compressor 176. The compressor may be connected to an inlet system 160 of the dynamic extraction vessel 115 or the inlet of a condenser 181 comprising a chiller loop 183. The condenser 181 may desirably permit condensation of the extraction gas 108, which may permit recycling of the extraction gas 108. An outlet of the condenser 181 may connect to an inlet of a storage vessel 102, wherein the storage vessel 102 may be configured to receive the recycled extraction gas 108 from the condenser 181. The chiller loop 183 may desirably permit the condensation of a broad range of volatilized extraction gases. In disclosed embodiments, having the compressor 176 connect to the dynamic extraction vessel 115 may advantageously permit the recycling of the extraction gas 108 directly into the dynamic extraction vessel 115.

According to disclosed embodiments, FIG. 2 illustrates a system 200 for extracting organic products according to a specific example embodiments of the disclosure. A system 200 may comprise a storage vessel 202, which may be configured to store an extraction gas in a phase, the phase comprising a gas, a liquid, a supercritical fluid, or a combination thereof. An outlet of the storage vessel 202 may connect to an inlet of a dynamic extraction vessel 215, and optionally to an inlet of an evacuation pump 217. An outlet of the extraction liquid storage vessel may connect to an inlet of the gas dryer system 280 comprising a desiccant assembly 261, which may advantageously permit purification of or moisture removal from an extraction gas. In disclosed embodiments, removal of moisture from an extraction solvent and or system 200 may desirably permit extraction of organic compounds that may be sensitive to moisture. A diaphragm pump 278 or a compressor 276 may connect the gas dryer system 280 to the storage vessel 202, wherein the diaphragm pump 278 or the compressor 276 may regulate the flow of the extraction gas from the gas dryer system 280 to the storage vessel 202. An inlet of the storage vessel 202 may connect to an outlet of a condenser 281 comprising a chiller 282, which may desirably permit condensation of the extraction gas recovered from various components of the system 200, which may permit recycling of the extraction gas by feeding the recycled extraction gas to the storage vessel 202, where it can be then used to continue extracting organic compounds from a natural source.

According to disclosed embodiments, an inlet of a dynamic extraction vessel 215 may connect to an outlet of a storage vessel 202. The dynamic extraction vessel 215 may connect to a vacuum pump 217 through a series of valves that serve as an air purge line that may desirably permit pressure regulation or extraction gas removal from the dynamic extraction vessel 215. The dynamic extraction vessel 215 may comprise an acoustic transducer 244 and may connect to the gas dryer system 280, wherein the extraction gas or a moisture rich extraction vapor may be removed from the dynamic extraction vessel 215, and then purified or dried. An outlet of the dynamic extraction vessel may connect to an intermediate storage vessel 254. During a method for extracting an organic compound from a natural source, once the concentration of an extractant (e.g., organic compound) within the extraction gas/solvent has reached a desirable concentration, a solute can then be transported to the intermediate storage vessel 254, advantageously permitting the extraction gas/solvent recovery system to optionally operate independent of other components of the system 200.

An outlet of the intermediate storage vessel 254 may connect to an inlet of the gas dryer system 280, which may permit recycling of the extraction gas from the solute. In disclosed embodiments, the intermediate storage vessel 254 may be used to concentrate a solute, which may desirably permit isolation or recrystallization in a spray evaporation loop system 270. An outlet of the intermediate storage vessel 254 may connect to an inlet or an injection nozzle 271 of the spray evaporation loop system 270.

In disclosed embodiments, as shown in FIG. 2, a spray evaporation loop system 270 may comprise a loop comprising a cyclone 272, at least one filter 273, a blower 274, a heat exchanger 277, and a flash drum 276. Being configured in a loop may desirably promote system efficiency by permitting extraction gas/solvent recycling as the extraction gas is removed from a solute. Recycling may benefit system efficiency while reducing exposure to an environment outside of a system 200. The spray evaporation loop system 270 may connect to a gas dryer system 280, which may permit extraction gas purification so that recycled extraction gas does not convey impurities throughout the system 100. The heat exchanger 277 may connect to a boiler system 290 comprising a loop of a boiler 291, a pressure relief valve 292, a site gauge 293, a y-strainer 294, a taco pump 295, a de-aerator 296, and a water storage tank 297. A system 200 comprising a boiler system 290 may desirably provide or exchange heat throughout the system 200, which may promote extraction yield or selectivity. For example, in disclosed embodiments, providing heat during an extraction process may increase a rate of extraction of an organic compound from a natural source. A system 200 comprising a boiler system 290 may desirably permit the volatilization or condensation of the extraction gas during recycling of the extraction gas. An outlet of the cyclone 272 may connect to an inlet of a product collection vessel 275. In disclosed embodiments, an outlet of the product collection vessel may connect to or be in gaseous communication with the gas dryer system 280, wherein a 3-way solenoid 253 and a 2-way solenoid 251 may regulate pressure or flow of an extraction gas from a product collection vessel 275 to a gas dryer system 280. Having the gas dryer system 280 connected to the product collection vessel 275 may desirably permit drying or continued purification of the organic compound extracted from the natural source.

The various methods and techniques described above provide a number of ways to carry out the application. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. For example, a system (e.g., FIG. 1, 100; FIG. 2, 200) for extracting organic compound from a natural source may be configured for a bench top scale, a pilot plant scale, a plant scale, or a combination thereof. A variety of alternatives are mentioned herein. It is to be understood that some preferred embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments or uses and modifications and equivalents thereof.

In disclosed embodiments, the numbers expressing quantities of ingredients, properties such extraction conditions, temperatures, pressures, and so forth, used to describe and claim certain embodiments of the application are to be understood as being modified in some instances by the term "about" or "substantially". For example, "about" or "substantially" can indicate ±1%, ±2%, ±3%, ±4%, ±5%, ±6%, ±7%, ±8%, ±9%, ±10%, ±11, %, ±12%, ±13%, ±14%, ±15%, or ±20% variation of the value it describes, unless otherwise stated. Accordingly, in disclosed embodiments, the numerical parameters set forth in the written description and attached claims are approximations that can vary depending upon the desired properties sought to be obtained by a particular embodiment. In disclosed embodiments, the numerical parameters are construed in light of the number of reported significant digits and by applying ordinary rounding techniques. Notwithstanding that the numerical ranges and parameters setting forth the broad scope of disclosed embodiments of the application are approximations, the numerical values set forth in the specific examples are reported as precisely as practicable.

In disclosed embodiments, the terms "a" and "an" and "the" and similar references used in the context of describing a particular embodiment of the application (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application.

Preferred embodiments of this application are described herein, including the best mode known to the inventors for carrying out the application. Variations on those preferred embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

Each of the patents, patent applications, publications of patent applications, and other material, such as articles, books, specifications, publications, documents, things, or the like, referenced herein are hereby incorporated herein by this reference in their entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, or the use of a term associated with any of the incorporated material and that associated with the present document, the description, definition, or the use of the term in the present document shall prevail.

Computer processors may encompass any types of computing machinery for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

Various computer elements have been illustrated herein as single computer servers or machines, such elements may operate over several different physical machines, or they may be combined as operating code instances running on a single physical machine. The claims in the present application comprehend such variation in physical machine configuration. Program memory associated with a computer processor may include internal or external programs to the processor, and it may be dynamic, static, volatile, and nonvolatile memory.

Words of comparison, measurements, and timing such as a "at the time," "equivalent," "during," "compete," and the like should be understood to mean "substantially at the time," "substantially equivalent," "substantially during," "substantially complete," etc., where "substantially" mean as that such comparisons, measurements, and timings are practicable to accomplish the implicitly or expressly stated desired result.

In closing, it is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

What is claimed is:

1. A method for extracting an organic compound from a natural source, the method comprising:
    (a) charging a storage vessel with at least two extraction gases;
    (b) premixing the at least two extraction gases to form a premixed extraction gas;
    (c) combining the premixed extraction gas with the natural source to form an extraction mixture in a dynamic extraction vessel, wherein the dynamic extraction vessel comprises:
        (i) a pressure vessel;
        (ii) an extraction chamber concentrically contained within the pressure vessel;
        (iii) a perforated drum configured to rotate about a principal axis of the perforated drum, wherein the perforated drum is substantially cylindrical in shape, and wherein the perforated drum is concentrically contained within the extraction chamber;
        (iv) a drum rotator;
        (v) a first dynamic extraction vessel inlet;
        (vi) a first dynamic extraction vessel outlet;
        (vii) a sensor for monitoring the extraction process; and
        (viii) a natural source receptacle configured to receive the natural source;
    (d) rotating the perforated drum containing the extraction mixture to form a spent natural source and a solute, wherein the solute comprises an organic compound and at least a portion of the premixed extraction gas;
    (e) separating the solute from the spent natural source to form a separated solute and a separated spent natural source;
    (f) recovering at least a portion of the extraction gas from the separated solute to form a recovered extraction gas and a dried organic compound, wherein the dried organic compound is substantially free of the extraction gas; and
    (g) recycling the recovered extraction gas to form a recycled extraction gas.

2. The method according to claim 1, further comprising sonicating the extraction mixture.

3. The method according to claim 1, further comprising analyzing the separated solute with a chemical detection system comprising an ultra-violet-visible-near infrared spectrometer, a fourier transform infrared spectrometer, a time of flight mass spectrometer, a single quadruple mass spectrometer, a gas chromatography-mass spectrometry instrument, a high-performance liquid chromatograph, a gas chromatograph, a high-performance liquid chromatography mass spectrometer, or a combination thereof.

4. The method according to claim 1, further comprising analyzing the dried organic compound with a chemical detection system comprising an ultra-violet-visible-near infrared spectrometer, a fourier transform infrared spectrometer, a time of flight mass spectrometer, a single quadruple mass spectrometer, a gas chromatography-mass spectrometry instrument, a high-performance liquid chromatograph, a gas chromatograph, a high-performance liquid chromatography mass spectrometer, or a combination thereof.

5. The method according to claim 1, further comprising analyzing the recovered extraction gas with a chemical detection system comprising an ultra-violet-visible-near infrared spectrometer, a fourier transform infrared spectrometer, a time of flight mass spectrometer, a single quadruple mass spectrometer, a gas chromatography-mass spectrometry instrument, a high-performance liquid chromatograph, a gas chromatograph, a high-performance liquid chromatography mass spectrometer, or a combination thereof.

6. The method according to claim 1, wherein the natural source is a plant selected from the group consisting of *Piper* spp., *Cannabis* spp., *Salvia* spp., *Banisteriopsis* spp., *Psychotria* spp., *Diplopterys* spp., *Peganum* spp., and *Humulus* spp.

7. The method according to claim 1, wherein the natural source is a *Cannabis sativa*.

8. The method according to claim 1, wherein the natural source is a plant selected from the group consisting of *Banisteriopsis* caapi, *Psychotria viridis*, *Diplopterys* cabrerana, *Peganum harmala*, and *Humulus lupulus*.

9. The method according to claim 1, wherein the at least two extraction gases comprise a chlorofluorocarbon, a chlorofluoroolefin, a hydrochlorofluorocarbon, a hydrocarbon, an ether, a hydrochlorofluoroolefin, a hydrofluorocarbon, a hydrofluoroolefin, a perfluorocarbon, a perchlorocarbon, a haloalkane, or combinations thereof.

10. The method according to claim 9, wherein the chlorofluorocarbon is selected from the group consisting of trichlorofluoromethane, dichloro difluoromethane, chloro trifluoromethane, dichloro fluoromethane, chloro difluoromethane, chlorofluoromethane, pentachlorofluoroethane, 1,1,2,2-tetrachloro-1,2-difluoroethane, 1,1,1,2-tetrachloro-2,2-difluoroethane, 1,1,2-trichloro-1,2,2-trifluoroethane, 1,1,1-trichloro-2,2,2-trifluoroethane, 1,2-dichloro tetrafluoro ethane, 1,1-dichloro tetrafluoro ethane, chloro pentafluoroethane, 1,1,1,2,2,3,3-heptachloro-3-fluoropropane, hexachlorodifluoropropane, 1,1,1,3,3-pentachloro-2,2,3-trifluoropropane, 1,2,2,3-tetrachloro-1,1,3,3-tetrafluoropropane, 1,1,1-trichloro-2,2,3,3,3-pentafluoropropane, 1,2-dichloro-1,1,2,3,3,3-hexafluoropropane, 1,3-dichloro-1,1,2,2,3,3-hexafluoropropane, 1-chloro-1,1,2,2,3,3,3-heptafluoropropane, dichlorohexafluorocyclobutane, and chloroheptafluorocyclobutane.

11. The method according to claim 9, wherein the ether is selected from the group consisting of dimethyl ether, methyl ethyl ether, methyl n-propyl ether, methyl isopropyl ether, methyl-n-butyl ether, diethyl ether, methyl tert-butyl ether, ethyl tert-butyl ether, furan, and tetrahydrofuran.

12. The method according to claim 9, wherein the hydrocarbon may be selected from the group consisting of methane, ethane, propane, butane, pentane, hexane, heptane, octane, nonane, decane, ethene, ethyne, propene, propyne, butene, butyne, pentene, and pentyne.

13. The method according to claim 9, wherein a hydrofluorocarbon comprises trifluoromethane, difluoromethane, fluoromethane, pentafluoroethane, pentafluorodimethyl ether, 1,1,2,2-Tetrafluoroethane, 1,1,1,2-tetrafluoroethane, bis(difluoromethyl)ether, 1,1,2-trifluoroethane, 1,1,1-trifluoroethane, methyltrifluoromethyl ether, 2,2,2-trifluoroethyl methyl ether, 1,2-difluoroethane, 1,1-difluoroethane, fluoroethane, 1,1,2,2,3,3,3-heptafluoropropane, trifluoromethyl 1,1,2,2-tetrafluoroethyl ether, 1,1,1,2,3,3,3-heptafluoropropane, trifluoromethyl 1,2,2,2-tetrafluoroethyl ether, 1,1,1,2,2,3-hexafluoropropane, 1,1,1,2,3,3-hexafluoropropane, 1,1,1,3,3,3-hexafluoropropane, 1,2,2,2-tetrafluoroethyl difluoromethyl ether, hexafluoropropane, pentafluoropropane, and 1,1,2,3,3-pentafluoropropane.

14. The method according to claim 1, wherein the at least two extraction gases each comprise a phase, wherein the phase comprises a gas, a liquid, a supercritical fluid, or a combination thereof.

15. The method according to claim 1, wherein the rotating perforated drum comprises rotating the perforated drum at an angular velocity from about 10 revolutions per minute to about 400 revolutions per minute.

16. The method according to claim 1, further comprising heating the extraction mixture at a temperature from about 0° C. to about 200° C.

* * * * *